(12) United States Patent
Kim et al.

(10) Patent No.: US 12,417,002 B2
(45) Date of Patent: Sep. 16, 2025

(54) ELECTRONIC DEVICE

(71) Applicant: Samsung Display Co., Ltd., Yongin-si (KR)

(72) Inventors: Eunyoung Kim, Yongin-si (KR); Hyeyun Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/545,830

(22) Filed: Dec. 19, 2023

(65) Prior Publication Data

US 2024/0201817 A1  Jun. 20, 2024

(30) Foreign Application Priority Data

Dec. 20, 2022  (KR) ................ 10-2022-0179394

(51) Int. Cl.
*G06F 3/041* (2006.01)
*G06F 3/044* (2006.01)

(52) U.S. Cl.
CPC .......... *G06F 3/0446* (2019.05); *G06F 3/0443* (2019.05); *G06F 2203/04112* (2013.01)

(58) Field of Classification Search
None
See application file for complete search history.

(56) References Cited

U.S. PATENT DOCUMENTS

| | | | |
|---|---|---|---|
| 10,824,287 B2 | 11/2020 | Hwang et al. | |
| 11,385,751 B2 | 7/2022 | Bang et al. | |
| 11,487,376 B2 | 11/2022 | Kim et al. | |
| 2016/0378224 A1* | 12/2016 | Kwon | H10K 59/1315 345/174 |
| 2021/0141490 A1* | 5/2021 | Bang | G06F 3/0412 |

FOREIGN PATENT DOCUMENTS

| | | |
|---|---|---|
| KR | 10-2021-0056468 A | 5/2021 |
| KR | 10-2382639 B1 | 4/2022 |
| KR | 10-2022-0094560 A | 7/2022 |

* cited by examiner

*Primary Examiner* — Brian M Butcher
(74) *Attorney, Agent, or Firm* — Womble Bond Dickinson (US) LLP

(57) ABSTRACT

An electronic device includes: an electrode including a first mesh line; a first cross electrode crossing the electrode and including a second mesh line; a second cross electrode crossing the electrode and spaced apart from the first cross electrode; and a trace line overlapping the first cross electrode, electrically connected to the second cross electrode, and including a third mesh line. A width of the second mesh line is greater than a width of the third mesh line.

20 Claims, 13 Drawing Sheets

ELECTRONIC DEVICE

CROSS-REFERENCE TO RELATED APPLICATION

This application claims priority to and the benefit of Korean Patent Application No. 10-2022-0179394, filed on Dec. 20, 2022, in the Korean Intellectual Property Office, the entire content of which is incorporated herein by reference.

BACKGROUND

1. Field

Aspects of embodiments of the present disclosure relate to an electronic device.

2. Description of the Related Art

Multimedia electronic devices, such as televisions, mobile phones, tablet computers, navigation systems, game consoles, and vehicle electronic devices, may display images and provide a touch-based input method that enables users to input information or commands easily, intuitively, and conveniently in addition to typical input methods, such as buttons, keyboards, and mouse devices.

SUMMARY

Embodiments of the present disclosure provide an electronic device with improved sensing performance.

According to an embodiment of the present disclosure, an electronic device includes: an electrode including a first mesh line; a first cross electrode crossing the electrode and including a second mesh line; a second cross electrode crossing the electrode and spaced apart from the first cross electrode; and a trace line overlapping the first cross electrode, electrically connected to the second cross electrode, and including a third mesh line. A width of the second mesh line is greater than a width of the third mesh line.

In an embodiment, the electronic device may further include an insulating layer between the trace line and the first cross electrode.

In an embodiment, the insulating layer may include an organic material.

In an embodiment, an upper surface of the insulating layer may have a first protruding portion corresponding to a shape of the third mesh line.

In an embodiment, the second mesh line may cover an upper surface of the first protruding portion of the insulating layer and side surfaces of the first protruding portion.

In an embodiment, the electronic device may further include a dummy mesh line below the insulating layer and on a same layer as the trace line. The insulating layer may further include a second protruding portion corresponding to a shape of the dummy mesh line, and the first mesh line may be on the second protruding portion.

In an embodiment, the first mesh line may be on an upper surface of the second protruding portion and spaced apart from side surfaces of the second protruding portion.

In an embodiment, the first mesh line may cover an upper surface of the second protruding portion and side surfaces of the second protruding portion.

In an embodiment, the electronic device may further include a dummy mesh line below the insulating layer and on a same layer as the trace line. A width of the first mesh line may be greater than or equal to a width of the dummy mesh line.

In an embodiment, the trace line may not overlap the electrode.

According to an embodiment of the present disclosure, an electronic device includes: a display layer having a display region configured to display an image and a peripheral region adjacent to the display region; and a sensor layer on the display layer. The sensor layer includes a plurality of first electrodes arranged in a first direction; a plurality of second electrodes arranged in a second direction crossing the first direction and crossing the plurality of first electrodes; a plurality of first trace lines electrically connected to the plurality of first electrodes, respectively; and a plurality of second trace lines electrically connected to the plurality of second electrodes, respectively, and at least partially overlapping the display region. A width of a mesh line from among the plurality of second trace lines may be smaller than a width of a mesh line from among the plurality of second electrodes.

In an embodiment, the plurality of second trace lines may not overlap the plurality of first electrodes.

In an embodiment, the plurality of first electrodes or the plurality of second electrodes may include: a plurality of sensing patterns; and a plurality of bridge patterns on a layer different from that of the plurality of sensing patterns and electrically connected to the plurality of sensing patterns. The plurality of second trace lines may be on a same layer as the plurality of bridge patterns, and the sensor layer may further include an insulating layer between the plurality of sensing patterns and the plurality of bridge patterns.

In an embodiment, the insulating layer may include an inorganic material.

In an embodiment, an upper surface of the insulating layer may have a first protruding portion corresponding to a shape of a mesh line from among the plurality of second trace lines.

In an embodiment, the mesh line from among the plurality of second electrodes may cover an upper surface of the first protruding portion and side surfaces of the first protruding portion.

In an embodiment, the electronic device may further include a dummy mesh line below the insulating layer and on the same layer as the plurality of second trace lines. The insulating layer may further include a second protruding portion corresponding to a shape of the dummy mesh line, and a mesh line from among the plurality of first electrodes may be on the second protruding portion.

In an embodiment, the mesh line from among the plurality of first electrodes may be on an upper surface of the second protruding portion and spaced apart from side surfaces of the second protruding portion.

In an embodiment, the mesh line from among the plurality of first electrodes may cover an upper surface of the second protruding portion and the side surfaces of second protruding portion.

In an embodiment, the width of the mesh line from among the plurality of second electrodes may be greater than or equal to the width of a mesh line from among the plurality of first electrodes.

BRIEF DESCRIPTION OF THE DRAWINGS

The accompanying drawings are included to provide a further understanding of the present disclosure and are incorporated in and constitute a part of this specification.

The drawings illustrate embodiments of the present disclosure and, together with the description, describe and explain aspects and features of the present disclosure. In the drawings.

DETAILED DESCRIPTION

Figure 1:
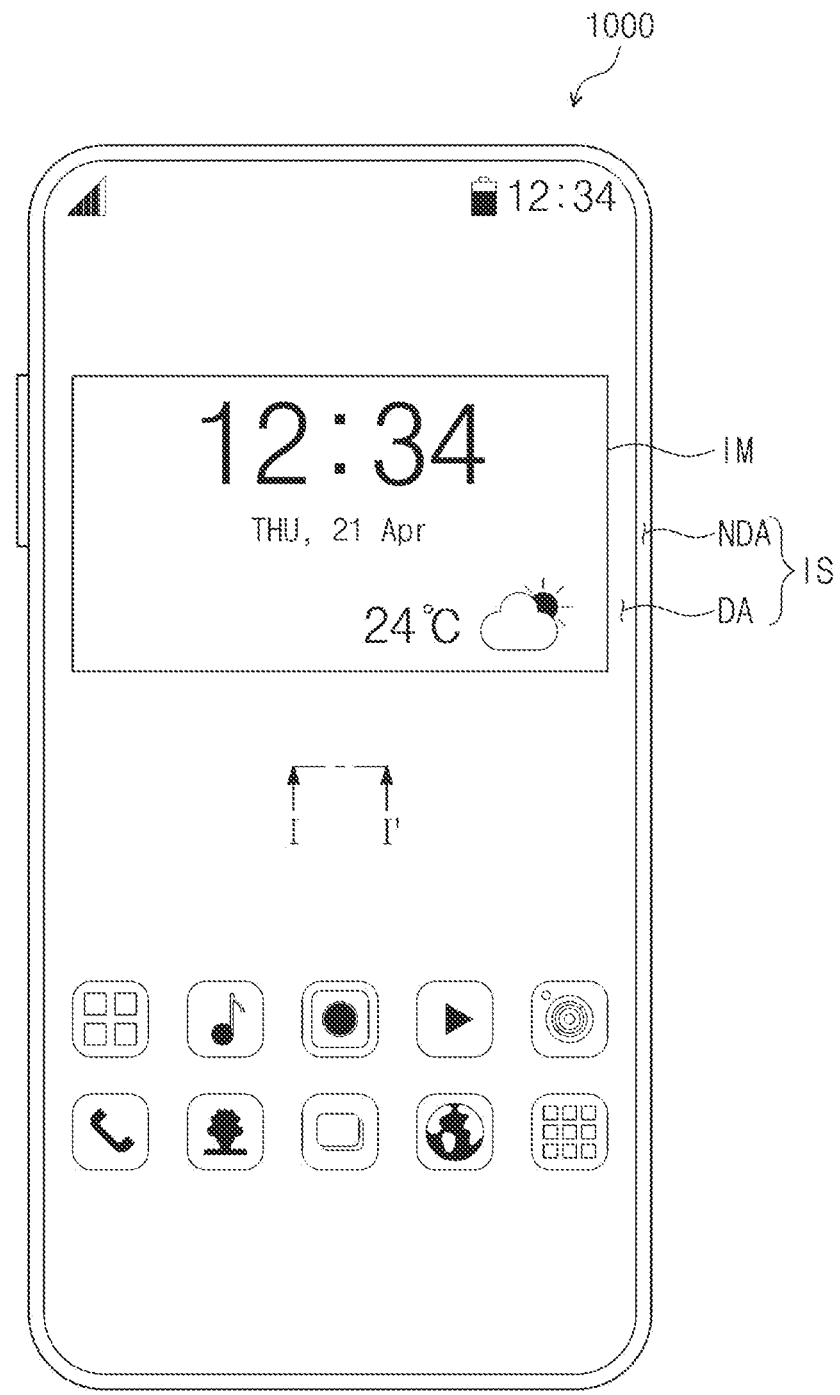
FIG. 1 is a plan view of an electronic device according to an embodiment of the present disclosure.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Unless otherwise defined, all terms (including technical and scientific terms) used in this specification have the same meaning as commonly understood by one of ordinary skill in the art to which this invention belongs. In addition, terms such as terms defined in commonly used dictionaries should be interpreted as having a meaning consistent with the meaning having in the context of the related technology and should not be interpreted as too ideal or too formal unless explicitly defined here.

Hereinafter, embodiments of the present disclosure will be described with reference to the drawings.

FIG. 1 is a plan view of an electronic device 1000 according to an embodiment of the present disclosure.

Referring to FIG. 1, the electronic device 1000 may be activated according to an electrical signal. The electronic device 1000 may be applied to various electronic devices, such as mobile phones, tablets, smart watches, laptop computers, computers, and smart televisions. In FIG. 1, the electronic device 1000 is illustrated as a mobile phone as an example.

The electronic device 1000 may display an image IM on a display surface IS parallel to each of first and second directions DR1 and DR2. The display surface IS on which an image IM is displayed may correspond to the front surface of the electronic device 1000. The image IM may be a still image as well as a dynamic image. The normal direction of the display surface IS, that is, the thickness direction of the electronic device 1000, is indicated by a third direction DR3. The front surface (or upper surface) and rear surface (or lower surface) of each layer or unit may be defined with respect to the third direction DR3.

The display surface IS of the electronic device 1000 may be divided into (e.g., may have) a display region DA and a peripheral region NDA. The display region DA may be a region at where the image IM is displayed. A user views the image IM through (or from) the display region DA. In this embodiment, the display region DA has a quadrangular shape with rounded vertices. However, this is illustrated as an example, and the display region DA may have various shapes and is not limited to any one shape.

The peripheral region NDA is adjacent to the display region DA. The peripheral region NDA may have a color (e.g., a predetermined color). The peripheral region NDA may be referred to as a non-display region or a bezel region. The peripheral region NDA may surround (e.g., may surround, in a plan view, or may extend around a periphery of) the display region DA. Accordingly, the shape of the display region DA may be substantially defined by the peripheral region NDA.

However, this is merely an example, and the peripheral region NDA may be disposed adjacent to only one or less than all sides of the display region DA or may be entirely omitted. The electronic device 1000, according to an embodiment of the present disclosure, may include various embodiments and is not limited to any one embodiment.

Figure 2:
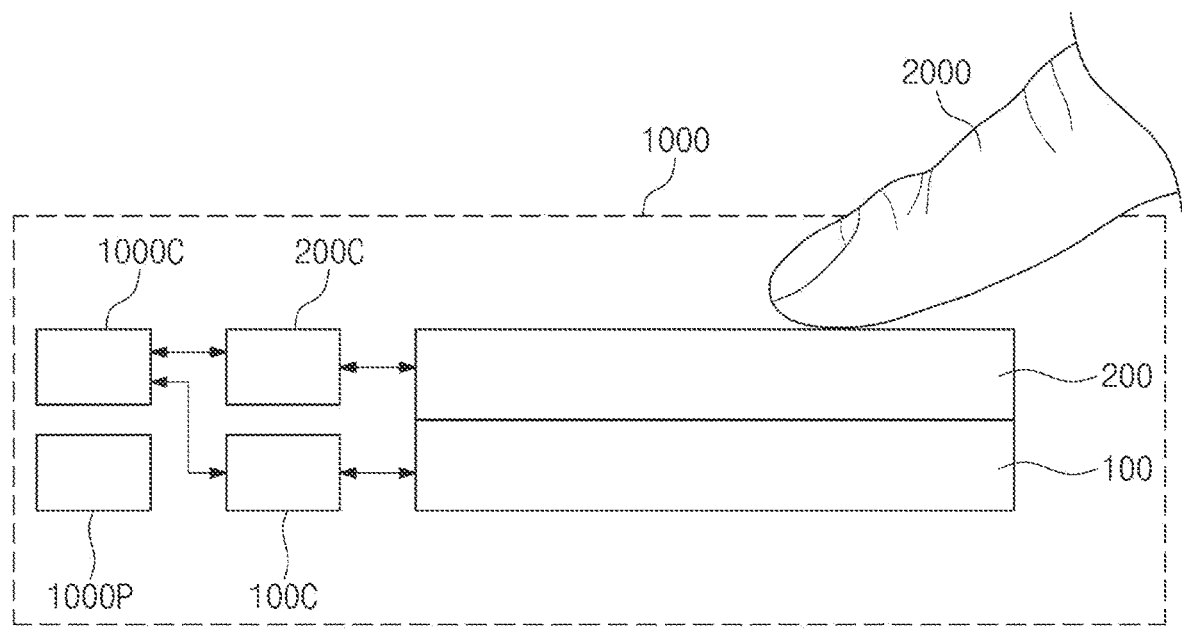
FIG. 2 is a block diagram schematically illustrating a use example of the electronic device according to an embodiment of the present disclosure.

FIG. 2 is a block diagram schematically illustrating a use example of the electronic device 1000 according to an embodiment of the present disclosure.

Referring to FIG. 2, the electronic device 1000 may include a display layer 100, a sensor layer 200, a display driver 100C, a sensor driver 2000, a main driver 1000C, and a power circuit 1000P.

The display layer 100 may be a component that substantially generates an image. The display layer 100 may be a light-emitting display layer. For example, the display layer 100 may include an organic light-emitting display layer, an inorganic light-emitting display layer, an organic-inorganic light-emitting display layer, a quantum dot display layer, a micro LED display layer, or a nano LED display layer.

The sensor layer 200 may be disposed on the display layer 100. The sensor layer 200 may sense an external input applied from the outside. The sensor layer 200 may be an integrated sensor continuously formed during the manufacturing process of the display layer 100 or may be an external sensor attached to the display layer 100.

The main driver 1000C may control the overall operation of the electronic device 1000. For example, the main driver 1000C may control the operation of the display driver 100C and the sensor driver 2000. The main driver 1000C may include at least one microprocessor, and the main driver 1000C may be referred to as a host. The main driver 1000C may further include a graphic controller.

The display driver 100C may drive the display layer 100. The display driver 100C may receive image data and control signals from the main driver 1000C. The control signals may include various signals. For example, the control signals may include an input vertical synchronizing signal, an input horizontal synchronizing signal, a main clock, a data enable signal, and the like.

The sensor driver 2000 may drive the sensor layer 200. The sensor driver 2000 may receive control signals from the main driver 1000C. The control signals may include a clock signal of the sensor driver 2000.

The power circuit 1000P may include a power management integrated circuit (PMIC). The power circuit 1000P may generate a plurality of driving voltages for driving the display layer 100, the sensor layer 200, the display driver 100C, and the sensor driver 2000. For example, the plurality of driving voltages may include a gate high voltage, a gate low voltage, an ELVSS voltage, an ELVDD voltage, an initialization voltage, and the like, but the present disclosure is not limited to the above examples.

The electronic device 1000 may sense inputs applied from the outside. For example, the electronic device 1000 may sense a passive input applied by a touch 2000. The touch 2000 may include a touch from, for example, a user's body and an input device (e.g., a pen), which cause a change in capacitance in the sensor layer 200.

Figure 3:
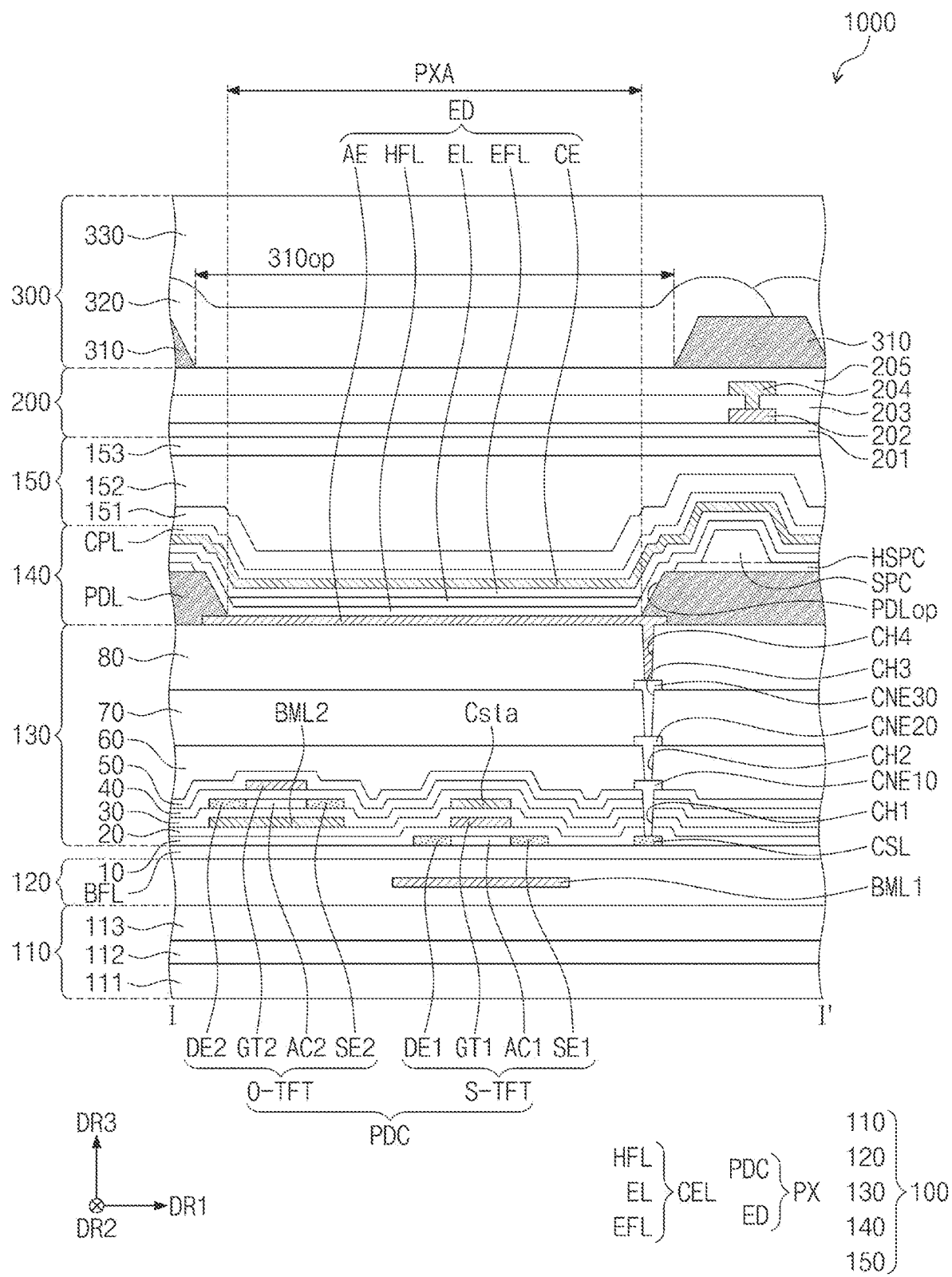
FIG. 3 is a cross-sectional view of the electronic device according to an embodiment of the present disclosure.

FIG. 3 is a cross-sectional view of the electronic device 1000 according to an embodiment of the present disclosure. For example, FIG. 3 may be a cross-sectional view taken along the line I-I' of FIG. 1.

Referring to FIG. 3, the electronic device 1000 may include the display layer 100, the sensor layer 200, and an anti-reflection layer 300. The display layer 100 may include a base layer 110, a barrier layer 120, a buffer layer BFL, a circuit layer 130, an element layer 140, and an encapsulation layer 150.

The base layer 110 may have a single-layer or multi-layer structure. For example, the base layer 110 may include first to third sub-base layers 111, 112, and 113. Each of the first sub-base layer 111 and the third sub-base layer 113 may include at least one of a polyimide-based resin, an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. In this specification, a "~~"-based resin is intended to include a functional group of "~~". For example, each of the first sub-base layer 111 and the third sub-base layer 113 may include polyimide.

The second sub-base layer 112 may have a single-layer or multi-layer structure. For example, the second sub-base layer 112 may include an inorganic material and may include at least one of silicon oxide, silicon nitride, silicon oxynitride, or amorphous silicon. For example, the second sub-base layer 112 may include silicon oxynitride and silicon oxide stacked thereon.

The barrier layer 120 may be disposed on the base layer 110. The barrier layer 120 may have a single-layer or multi-layer structure. The barrier layer 120 may include at least one of silicon oxide, silicon nitride, silicon oxynitride, or amorphous silicon.

The barrier layer 120 may further include a first lower light blocking layer BML1. For example, when the barrier layer 120 is a multi-layer structure, the first lower light blocking layer BML1 may be disposed between layers constituting the barrier layer 120. Without being limited thereto, however, the first lower light blocking layer BML1 may be disposed between the base layer 110 and the barrier layer 120 or may be disposed on (e.g., on an upper surface of) the barrier layer 120. In an embodiment of the present disclosure, the first lower light blocking layer BML1 may be omitted. The first lower light blocking layer BML1 may be referred to as a first lower layer, a first lower metal layer, a first lower electrode layer, a first lower shielding layer, a first light blocking layer, a first metal layer, a first shielding layer, or a first overlap layer.

The buffer layer BFL may be disposed on the barrier layer 120. The buffer layer BFL may prevent metal atoms or impurities from diffusing from the base layer 110 into a first semiconductor pattern. In addition, the buffer layer BFL may control a heat supply rate during a crystallization process for forming the first semiconductor pattern so that the first semiconductor pattern can be uniformly formed.

The buffer layer BFL may include a plurality of inorganic layers. For example, the buffer layer BFL may include a first sub-buffer layer including silicon nitride and a second sub-buffer layer disposed on the first sub-buffer layer and including silicon oxide.

The circuit layer 130 may be disposed on the buffer layer BFL, and the element layer 140 may be disposed on the circuit layer 130. A pixel PX may include a pixel circuit PDC and a light-emitting element ED electrically connected to the pixel circuit PDC. The pixel circuit PDC may be included in the circuit layer 130, and the light-emitting element ED may be included in the element layer 140.

FIG. 3 illustrates a silicon thin-film transistor S-TFT and an oxide thin-film transistor O-TFT of the pixel circuit PDC as examples. However, all transistors constituting the pixel circuit PDC may be silicon thin-film transistors S-TFT or oxide thin-film transistors O-TFT.

The first semiconductor pattern may be disposed on the buffer layer BFL. The first semiconductor pattern may include a silicon semiconductor. For example, the silicon semiconductor may include amorphous silicon, polycrystalline silicon, and the like. For example, the first semiconductor pattern may include low-temperature polysilicon.

FIG. 3 illustrates only a portion of the first semiconductor pattern disposed on the buffer layer BFL, and the first semiconductor pattern may be further disposed in another region. The first semiconductor pattern may be arranged in a specific pattern across pixels. The first semiconductor pattern may have different electrical properties depending on whether or not it is doped or not. The first semiconductor pattern may include a first region having high conductivity and a second region having low conductivity. The first region may be doped with an N-type dopant or a P-type dopant. A P-type transistor may include a doped region doped with a P-type dopant, and an N-type transistor may include a doped region doped with an N-type dopant. The second region may be a non-doped region or a region doped at a lower concentration than the first region.

The conductivity of the first region may be greater than that of the second region, and the first region may act as an electrode or a signal line. The second region may substantially correspond to an active region (or channel or channel region) of a transistor. For example, a portion of the semiconductor pattern may be an active region of a transistor, another portion thereof may be a source or drain of a transistor, and still another portion thereof may be a connection electrode or a connection signal line.

A source region SE1, an active region AC1, and a drain region DE1 of the silicon thin-film transistor S-TFT may be formed from the first semiconductor pattern. The source region SE1 and the drain region DE1 may extend in directions opposite to each other from the active region AC1 in a cross-sectional view.

FIG. 3 illustrates a portion of a connection signal line CSL formed from the first semiconductor pattern.

The circuit layer 130 may include a plurality of inorganic layers and a plurality of organic layers. In an embodiment of the present disclosure, first to fifth insulating layers 10, 20, 30, 40, and 50 sequentially stacked on the buffer layer BFL may be inorganic layers, and sixth to eighth insulating layers 60, 70, and 80 may be organic layers.

A first insulating layer 10 may be disposed on the buffer layer BFL. The first insulating layer 10 may cover the first semiconductor pattern. The first insulating layer 10 may be an inorganic layer and/or an organic layer and may have a single-layer or multi-layer structure. The first insulating layer 10 may include at least one of aluminum oxide, titanium oxide, silicon oxide, silicon nitride, silicon oxynitride, zirconium oxide, or hafnium oxide. In this embodiment, the first insulating layer 10 may be a single silicon oxide layer. Not only the first insulating layer 10 but also the insulating layers of the circuit layer 130 to be described below may have a single-layer or multi-layer structure.

A gate electrode GT1 of the silicon thin-film transistor S-TFT is disposed on the first insulating layer 10. The gate electrode GT1 may be a portion of a metal pattern. The gate electrode GT1 overlaps the active region AC1. In the process of doping the first semiconductor pattern, the gate electrode GT1 may act as a mask. The gate electrode GT1 may include titanium, silver, an alloy including silver, molybdenum, an alloy including molybdenum, aluminum, an alloy including aluminum, aluminum nitride, tungsten, tungsten nitride, copper, indium tin oxide, indium zinc oxide, or the like, but the present disclosure is not limited thereto.

A second insulating layer 20 may be disposed on the first insulating layer 10 to cover the gate electrode GT1. The second insulating layer 20 may be an inorganic layer and have a single-layer or multi-layer structure. The second insulating layer 20 may include at least one of silicon oxide, silicon nitride, or silicon oxynitride. In this embodiment, the second insulating layer 20 may be a single silicon nitride layer.

A third insulating layer 30 may be disposed on the second insulating layer 20. The third insulating layer 30 may be an inorganic layer and may have a single-layer or multi-layer structure. For example, the third insulating layer 30 may have a multi-layer structure including a silicon oxide layer and a silicon nitride layer. One electrode Csta of a capacitor may be disposed between the second insulating layer 20 and the third insulating layer 30. The other electrode of the capacitor may be disposed between the first insulating layer 10 and the second insulating layer 20.

A second semiconductor pattern may be disposed on the third insulating layer 30. The second semiconductor pattern may include an oxide semiconductor. The oxide semiconductor may include a plurality of regions divided according to whether or not a metal oxide is reduced. A region in which the metal oxide is reduced (hereinafter referred to as a reduced region) has higher conductivity than a region in which the metal oxide is not reduced (hereinafter referred to as a non-reduced region). The reduced region acts as a source/drain of a transistor or a signal line. The non-reduced region substantially corresponds to an active region (or semiconductor region or channel) of a transistor. For example, a portion of the second semiconductor pattern may be an active region of a transistor, another portion thereof may be a source/drain region of a transistor, and still another portion thereof may be a signal transmission region.

A source region SE2, an active region AC2, and a drain region DE2 of the oxide thin-film transistor O-TFT may be formed from the second semiconductor pattern. The source region SE2 and the drain region DE2 may extend in directions opposite to each other from the active region AC2 in a cross-sectional view.

A fourth insulating layer 40 may be disposed on the third insulating layer 30. The fourth insulating layer 40 may cover the second semiconductor pattern. The fourth insulating layer 40 may be an inorganic layer and have a single-layer or multi-layer structure. The fourth insulating layer 40 may include at least one of aluminum oxide, titanium oxide, silicon oxide, silicon nitride, silicon oxynitride, zirconium oxide, or hafnium oxide. In this embodiment, the fourth insulating layer 40 may be a single layer including silicon oxide.

A gate electrode GT2 of the oxide thin-film transistor O-TFT is disposed on the fourth insulating layer 40. The gate electrode GT2 may be a portion of a metal pattern. The gate electrode GT2 overlaps the active region AC2. In the process of reducing the second semiconductor pattern, the gate electrode GT2 may act as a mask.

A second lower light blocking layer BML2 may be disposed below the oxide thin-film transistor O-TFT. The second lower light blocking layer BML2 may be disposed between the second insulating layer 20 and the third insulating layer 30. The second lower light blocking layer BML2 may include the same material as one electrode Csta constituting the capacitor and may be formed through (or by) a same process.

A fifth insulating layer 50 may be disposed on the fourth insulating layer 40 to cover the gate electrode GT2. The fifth insulating layer 50 may be an inorganic layer and/or an organic layer and have a single-layer or multi-layer structure. For example, the fifth insulating layer 50 may have a multi-layer structure including a silicon oxide layer and a silicon nitride layer.

A first connection electrode CNE10 may be disposed on the fifth insulating layer 50. The first connection electrode CNE10 may be connected to the connection signal line CSL through a first contact hole (e.g., a first contact opening) CH1 passing through the first to fifth insulating layers 10, 20, 30, 40, and 50.

A sixth insulating layer 60 may be disposed on the fifth insulating layer 50. A second connection electrode CNE20 may be disposed on the sixth insulating layer 60. The second connection electrode CNE20 may be connected to the first connection electrode CNE10 through a second contact hole (e.g., a second contact opening) CH2 passing through the sixth insulating layer 60.

A seventh insulating layer 70 may be disposed on the sixth insulating layer 60 to cover the second connection electrode CNE20.

A third connection electrode CNE30 may be disposed on the seventh insulating layer 70. The third connection electrode CNE30 may be connected to the second connection electrode CNE20 through a third contact hole (e.g., a third contact opening) CH3 passing through the seventh insulating layer 70. An eighth insulating layer 80 may be disposed on the seventh insulating layer 70 to cover the third connection electrode CNE30.

The sixth insulating layer 60, the seventh insulating layer 70, and the eighth insulating layer 80 may be organic layers. For example, each of the sixth insulating layer 60, the seventh insulating layer 70, and the eighth insulating layer 80 may include a general-purpose polymer, such as benzocyclobutene (BCB), polyimide, hexamethyldisiloxane (HMDSO), polymethylmethacrylate (PMMA), or polystyrene (PS), a polymer derivative having a phenol-based group, an acrylic-based polymer, an imide-based polymer, an aryl ether-based polymer, an amide-based polymer, a fluorine-based polymer, a p-xylene-based polymer, a vinyl alcohol-based polymer, and blends thereof.

The light-emitting element ED may include a first electrode AE, a first functional layer HFL, a light-emitting layer EL, a second functional layer EFL, and a second electrode CE. The first functional layer HFL, the second functional layer EFL, and the second electrode CE may be commonly provided to the pixels PX (e.g., may be continuously provided to all of the pixels PX). The first functional layer HFL, the light-emitting layer EL, and the second functional layer EFL may be referred to as an intermediate layer CEL. The first electrode AE may be referred to as a pixel electrode or an anode, and the second electrode CE may be referred to as a common electrode or a cathode.

The first electrode AE may be disposed on the eighth insulating layer 80. The first electrode AE may be connected to the third connection electrode CNE30 electrically connected to the pixel circuit PDC through a fourth contact hole (e.g., a fourth contact opening) CH4 passing through the eighth insulating layer 80.

In an embodiment of the present disclosure, the third connection electrode CNE30 may be omitted. In such an embodiment, the first electrode AE may pass through the seventh and eighth insulating layers 70 and 80 to be connected to the second connection electrode CNE20. In addition, in an embodiment of the present disclosure, the third connection electrode CNE30 and the eighth insulating layer 80 may be omitted. In such an embodiment, the first electrode AE may be disposed on the seventh insulating layer 70, may pass through the seventh insulating layer 70, and may be connected to the second connection electrode CNE20.

The first electrode AE may be a (semi-)transmissive electrode or a reflective electrode. In an embodiment of the present disclosure, the first electrode AE may include: a reflective layer formed of silver, magnesium, aluminum, platinum, palladium, gold, nickel, neodymium, iridium, chromium, or a compound thereof; and a transparent or semi-transparent electrode layer formed on the reflective layer. The transparent or semi-transparent electrode layer may include at least one selected from the group consisting of indium tin oxide, indium zinc oxide, indium gallium zinc oxide, zinc oxide or indium oxide, and aluminum-doped zinc oxide. For example, the first electrode AE may have a multi-layer structure in which indium tin oxide, silver, and indium tin oxide are sequentially stacked.

A pixel defining film PDL may be disposed on the eighth insulating layer 80. The pixel defining film PDL may have a light-absorbing property; for example, the pixel defining film PDL may have a black color. The pixel defining film PDL may include a black coloring agent. The black coloring agent may include black dye and black pigment. The black coloring agent may include carbon black, a metal, such as chromium, or an oxide thereof.

An opening PDLop exposing a portion of the first electrode AE may be defined in the pixel defining film PDL. For example, the pixel defining film PDL may cover an edge of the first electrode AE and may expose a center of the first electrode AE. The light-emitting region PXA may be defined by the pixel defining film PDL (e.g., by the opening PDLop in the pixel defining film PDL).

A spacer HSPC may be disposed on the pixel defining film PDL. A protruding spacer SPC may be disposed on the spacer HSPC. The spacer HSPC and the protruding spacer SPC may have an integral shape (e.g., may be integrally formed) and may be formed of a same material. For example, the spacer HSPC and the protruding spacer SPC may be formed through a same process by using a halftone mask. However, this is only an example, and the present disclosure is not limited thereto. For example, the spacer HSPC and the protruding spacer SPC may include materials different from each other and/or may be formed by separate processes.

The first functional layer HFL may be disposed on the first electrode AE, the pixel defining film PDL, the spacer HSPC, and the protruding spacer SPC. The first functional layer HFL may include a hole transport layer HTL, a hole injection layer HIL, or both a hole transport layer and a hole injection layer. The first functional layer HFL may be disposed over the entire display region.

The light-emitting layer EL may be disposed on the first functional layer HFL and may be disposed in a region corresponding to the opening PDLop in the pixel defining film PDL. The light-emitting layer EL may include an organic material, an inorganic material, or an organic/inorganic material configured to emit light of a color (e.g., a predetermined color).

The second functional layer EFL may be disposed on the first functional layer HFL to cover the light-emitting layer EL. The second functional layer EFL may include an electron transport layer ETL, an electron injection layer EIL, or both an electron transport layer and an electron injection layer. The second functional layer EFL may be disposed over the entire display region.

The second electrode CE may be disposed on the second functional layer EFL. The second electrode CE may be disposed in the display region.

The element layer 140 may further include a capping layer CPL disposed on the second electrode CE. The capping layer CPL may improve light-emitting efficiency by the principle of constructive interference. For example, the capping layer CPL may include a material having a refractive index of about 1.6 or higher for light having a wavelength of about 589 nm.

The capping layer CPL may be an organic capping layer including an organic material, an inorganic capping layer including an inorganic material, or a composite capping layer including an organic material and an inorganic material. For example, the capping layer may include a carbocyclic compound, a heterocyclic compound, an amine group-containing compound, a porphyrin derivative, a phthalocyanine derivative, a naphthalocyanine derivative, an alkali metal complex, an alkaline earth metal complex, or any combination thereof. The carbocyclic compound, the heterocyclic compound, and the amine group-containing compound may be optionally substituted with a substituent containing oxygen (O), nitrogen (N), sulfur (S), selenium (Se), silicon (Si), fluorine (F), chlorine (CI), bromine (Br), iodine (I), or any combination thereof.

The encapsulation layer 150 may be disposed on the element layer 140. The encapsulation layer 150 may include a first inorganic encapsulation layer 151, an organic encapsulation layer 152, and a second inorganic encapsulation layer 153, which are sequentially stacked. The first and second inorganic encapsulation layers 151 and 153 may protect the element layer 140 from moisture and oxygen, and the organic encapsulation layer 152 may protect the element layer 140 from foreign substances, such as dust particles.

In an embodiment of the present disclosure, a low refractive index layer may be further disposed between the capping layer CPL and the encapsulation layer 150. The low refractive index layer may include lithium fluoride. The low refractive index layer may be formed by thermal evaporation.

The sensor layer 200 may be disposed on the display layer 100. The sensor layer 200 may be referred to as a sensor, an input sensing layer, or an input sensing panel. The sensor layer 200 may include a sensor base layer 201, a first sensor conductive layer 202, a sensor insulating layer 203, a second sensor conductive layer 204, and a sensor cover layer 205.

The sensor base layer 201 may be disposed directly on the display layer 100. The sensor base layer 201 may be an inorganic layer including at least any one of silicon nitride, silicon oxynitride, or silicon oxide. In other embodiments, the sensor base layer 201 may be an organic layer including an epoxy resin, an acrylic resin, or an imide-based resin. The sensor base layer 201 may have a single-layer structure or a multi-layer structure stacked along the third direction DR3.

Each of the first sensor conductive layer 202 and the second sensor conductive layer 204 may have a single-layer structure or a multi-layer structure stacked along the third direction DR3.

The conductive layer having a single-layer structure may include a metal layer or a transparent conductive layer. The metal layer may include molybdenum (Mo), silver (Ag), titanium (Ti), copper (Cu), aluminum (Al), or an alloy thereof. The transparent conductive layer may include a transparent conductive oxide, such as indium tin oxide, indium zinc oxide, zinc oxide, or indium zinc tin oxide. In addition, the transparent conductive layer may include a conductive polymer, such as poly(3,4-ethylenedioxythiophene) (PEDOT), metal nanowire, graphene, and the like.

The conductive layer having a multi-layer structure may include metal layers. The conductive layer may have, for example, a three-layer structure of titanium/aluminum/titanium. The multi-layer conductive layer may include at least one metal layer and at least one transparent conductive layer.

The sensor insulating layer 203 may be disposed between the first sensor conductive layer 202 and the second sensor conductive layer 204. The sensor insulating layer 203 may include an organic material. The organic film may include at least any one of an acrylic-based resin, a methacrylic-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin.

In other embodiments, the sensor insulating layer 203 may include an inorganic material. The inorganic film may include at least one of aluminum oxide, titanium oxide, silicon oxide, silicon nitride, silicon oxynitride, zirconium oxide, or hafnium oxide.

The sensor cover layer 205 may be disposed on the sensor insulating layer 203 to cover the second sensor conductive layer 204. The second sensor conductive layer 204 may include a conductive pattern. The sensor cover layer 205 may cover the conductive pattern and may reduce or eliminate the probability of damage to the conductive pattern in a subsequent process. The sensor cover layer 205 may include inorganic or organic materials. For example, the sensor cover layer 205 may include silicon nitride, but the present disclosure is not limited thereto. In an embodiment of the present disclosure, the sensor cover layer 205 may be omitted.

The anti-reflection layer 300 may be disposed on the sensor layer 200. The anti-reflection layer 300 may include a partition layer 310, a plurality of color filters 320, and a planarization layer 330.

The partition layer 310 may be disposed to overlap the conductive pattern of the second sensor conductive layer 204. The sensor cover layer 205 may be disposed between the partition layer 310 and the second sensor conductive layer 204. The partition layer 310 may prevent the reflection of external light from the second sensor conductive layer 204. A material constituting the partition layer 310 is not particularly limited as long as the material can absorb light. The partition layer 310 may have a black color, and in an embodiment of the present disclosure, the partition layer 310 may include a black coloring agent. The black coloring agent may include black dye and black pigment. The black coloring agent may include carbon black, a metal, such as chromium, or an oxide thereof.

A partition opening 3100p may be defined in the partition layer 310. The partition opening 3100p may overlap the light-emitting layer EL. A color filter 320 may be disposed to correspond to the partition opening 3100p. The color filter 320 may transmit light provided from (or emitted from) the light-emitting layer EL overlapping the color filter 320.

The planarization layer 330 may cover the partition layer 310 and the color filter 320. The planarization layer 330 may include an organic material and may provide (or may have) a flat (or planar) upper surface. In an embodiment of the present disclosure, the planarization layer 330 may be omitted.

In an embodiment of the present disclosure, the anti-reflection layer 300 may include a reflection control layer instead of the color filters 320. For example, referring to the embodiment shown in FIG. 3, the color filter 320 may be omitted, and the reflection control layer may be added from where the color filter 320 is omitted. The reflection control layer may selectively absorb light of a certain band (e.g., a certain wavelength band) from among light reflected from inside of the display panel and/or from the electronic device or incident from the outside of the display panel and/or from the electronic device.

For example, the reflection control layer may absorb a first wavelength range of about 490 nm to about 505 nm and a second wavelength range of about 585 nm to about 600 nm so that light transmittance in the first wavelength range and the second wavelength range may be about 40% or less. The reflection control layer may absorb light having a wavelength other than (or outside of) the wavelength range of red light, green light, and blue light emitted from the light-emitting layer EL. In this way, the reflection control layer absorbs light that is emitted from the light-emitting layer EL and has a wavelength that does not belong to (or other than) the red, green, or blue wavelength range, thereby preventing or minimizing a decrease in the luminance of the display panel and/or the electronic device. In addition, at the same time, a decrease in the light-emitting efficiency of the display panel and/or the electronic device may be prevented or minimized and visibility may be improved.

The reflection control layer may be provided as an organic material layer including a dye, a pigment, or a combination thereof. The reflection control layer may include a tetraazaporphyrin (TAP)-based compound, a porphyrin-based compound, a metal porphyrin-based compound, an oxazine-based compound, a squarylium-based compound, a triarylmethane-based compound, a polymethine-based compound, anthraquinone-based compound, a phthalocyanine-based compound, an azo-based compound, a perylene-based compound, a xanthene-based compound, a diimmonium-based compound, a dipyrromethene-based compound, a cyanine-based compound, and a combination thereof.

In an embodiment of the present disclosure, the reflection control layer may have a transmittance of about 64% to about 72%. The transmittance of the reflection control layer may be adjusted according to the amount of pigment and/or dye in the reflection control layer.

In an embodiment of the present disclosure, the anti-reflection layer 300 may include a retarder and/or a polarizer. The anti-reflection layer 300 may include at least a polarizing film. In such an embodiment, the anti-reflection layer 300 may be attached to the sensor layer 200 by an adhesive layer. In an embodiment of the present disclosure, the anti-reflection layer 300 may be omitted.

Figure 4:
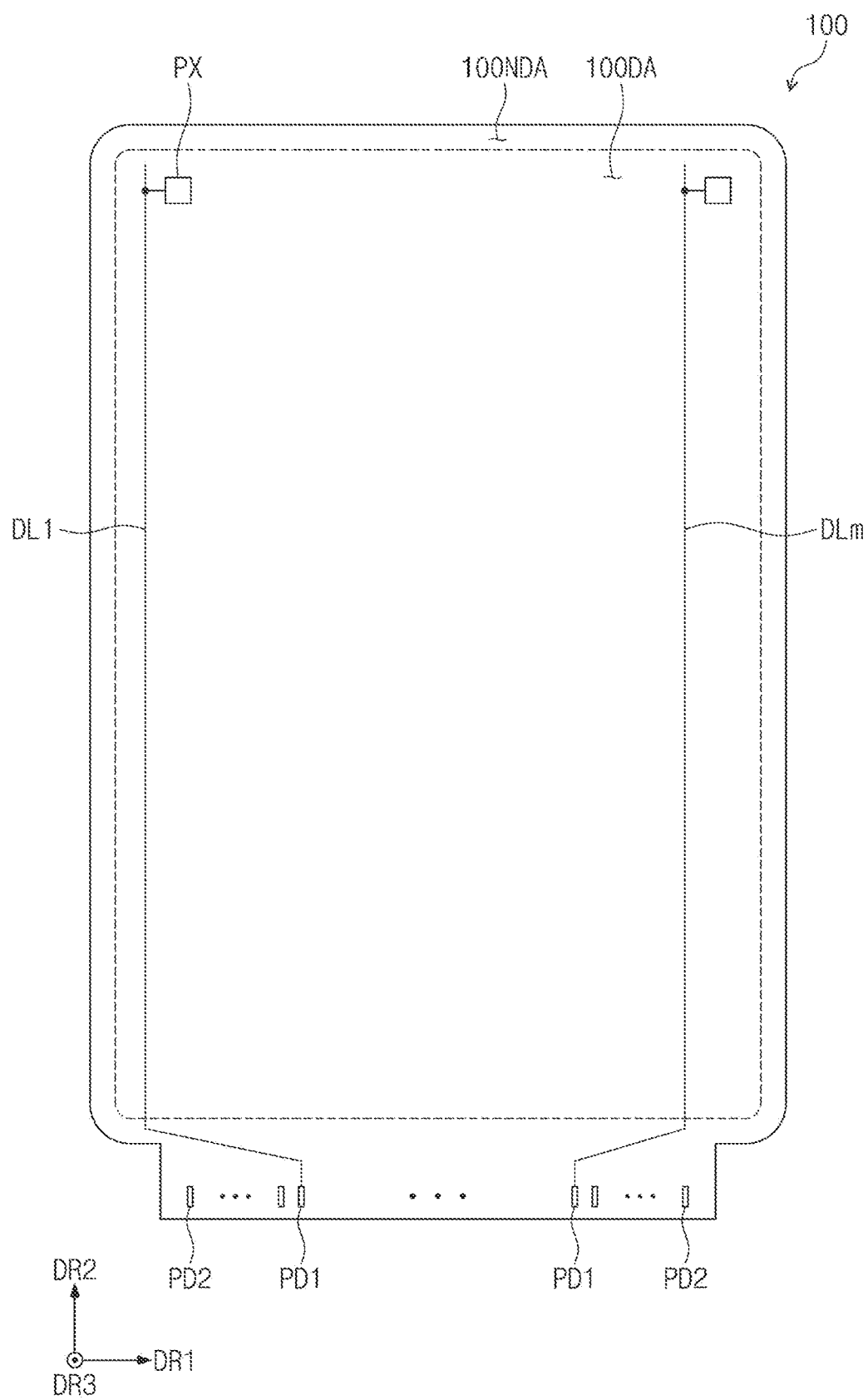
FIG. 4 is a plan view of a display layer according to an embodiment of the present disclosure.

FIG. 4 is a plan view of the display layer 100 according to an embodiment of the present disclosure.

Referring to FIG. 4, a display region 100DA configured to display an image and a peripheral region 100NDA adjacent to the display region 100DA may be defined in the display layer 100. The display region 100DA may correspond to the display region DA (see, e.g., FIG. 1) of the electronic device 1000, and the peripheral region 100NDA may correspond to the peripheral region NDA (see, e.g., FIG. 1) of the electronic device 1000. In this specification, an expression a region/portion "corresponds to" another region/portion means that they overlap each other, but the expression is not limited to having a same area.

FIG. 4 illustrates some components included in the display layer 100. The display layer 100 may include a plurality of pixels PX, a plurality of lines DL1 to DLm, a plurality of first pads PD1, and a plurality of second pads PD2. The display layer 100 may further include components other than those illustrated in FIG. 4. In addition, in an embodiment of the present disclosure, the display layer 100 may not include the second pads PD2.

The display region 100DA and the peripheral region 100NDA may be distinguished by whether or not the pixels PX are disposed therein. The pixels PX may be disposed in the display region 100DA, the plurality of lines DL1 to DLm connected to the pixels PX may be disposed in the display region 100DA and the peripheral region 100NDA, and the first pads PD1 and the second pads PD2 may be disposed in the peripheral region 100NDA. In an embodiment of the present disclosure, a driving chip may be mounted on the peripheral region 100NDA or a flexible circuit film on which the driving chip is mounted may be electrically connected to the first pads PD1.

Figure 5A:
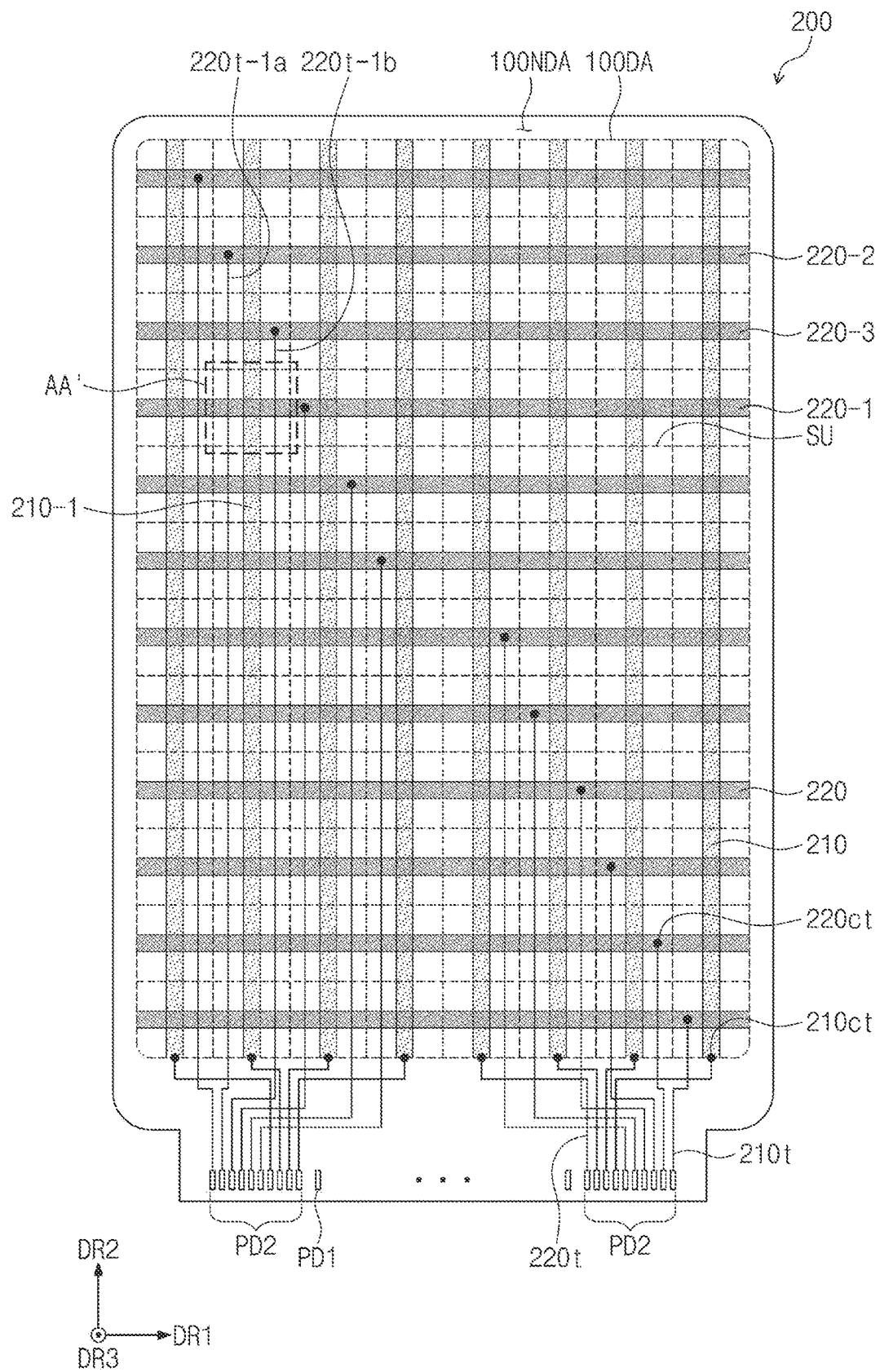
FIG. 5A is a plan view of a sensor layer according to an embodiment of the present disclosure.

FIG. 5A is a plan view of the sensor layer 200 according to an embodiment of the present disclosure.

Referring to FIG. 5A, the sensor layer 200 may include a plurality of first electrodes 210 and a plurality of second electrodes 220. The first electrodes 210 may be arranged along (e.g., may be adjacent to each other along) the first direction DR1, and the second electrodes 220 may be arranged along (e.g., may be adjacent to each other along) the second direction DR2 crossing (e.g., perpendicular to) the first direction DR1. Each of the first electrodes 210 may extend along (e.g., may primarily extend in) the second direction DR2, and each of the first electrodes 210 may cross the second electrodes 220. Each of the second electrodes 220 may extend along (e.g., may primarily extend in) the first direction DR1, and each of the second electrodes 220 may cross the first electrodes 210.

The display region 100DA and the peripheral region 100NDA of the display layer 100 (see, e.g., FIG. 4) are indicated on the sensor layer 200 shown in FIG. 5A. The first electrodes 210 and the second electrodes 220 may overlap the display region 100DA. The shape of each of the first electrodes 210 and the second electrodes 220 is schematically illustrated as a bar shape in FIG. 5A, but the shape thereof is not limited to the bar shape.

Although FIG. 5A exemplarily illustrates eight first electrodes 210 and twelve second electrodes 220, the number of each of the first electrodes 210 and the second electrodes 220 is not particularly limited thereto. For example, the number of first electrodes 210 and the number of second electrodes 220 may be variously changed according to the screen ratio of the electronic device 1000 (see, e.g., FIG. 1).

The sensor layer 200 may include a plurality of first trace lines 210t respectively electrically connected to the first electrodes 210 and a plurality of second trace lines 220t respectively electrically connected to the second electrodes 220. The first trace lines 210t and the second trace lines 220t may be respectively electrically connected to the second pads PD2.

In an embodiment of the present disclosure, the second trace lines 220t may extend to overlap (e.g., may extend into) the display region 100DA. For example, the second trace lines 220t may not be disposed in the peripheral region 100NDA adjacent to the display region 100DA in the first direction DR1. Accordingly, an area of the peripheral region 100NDA may be reduced. As a result, the area occupied by the peripheral region NDA (see, e.g., FIG. 1) on the display surface IS of the electronic device 1000 may be reduced, and a relatively narrow bezel may be implemented.

The first electrodes 210 and the first trace lines 210t may be respectively connected to each other through (or at) a plurality of first contacts 210ct. The second electrodes 220 and the second trace lines 220t may be respectively connected to each other through (or at) a plurality of second contacts 220ct. In an embodiment of the present disclosure, the first contacts 210ct may overlap the peripheral region 100NDA, and the second contacts 220ct may overlap the display region 100DA. However, the embodiment of the present disclosure is not limited thereto. For example, in an embodiment of the present disclosure, both the first contacts 210ct and the second contacts 220ct may overlap the display region 100DA.

Figure 5B:
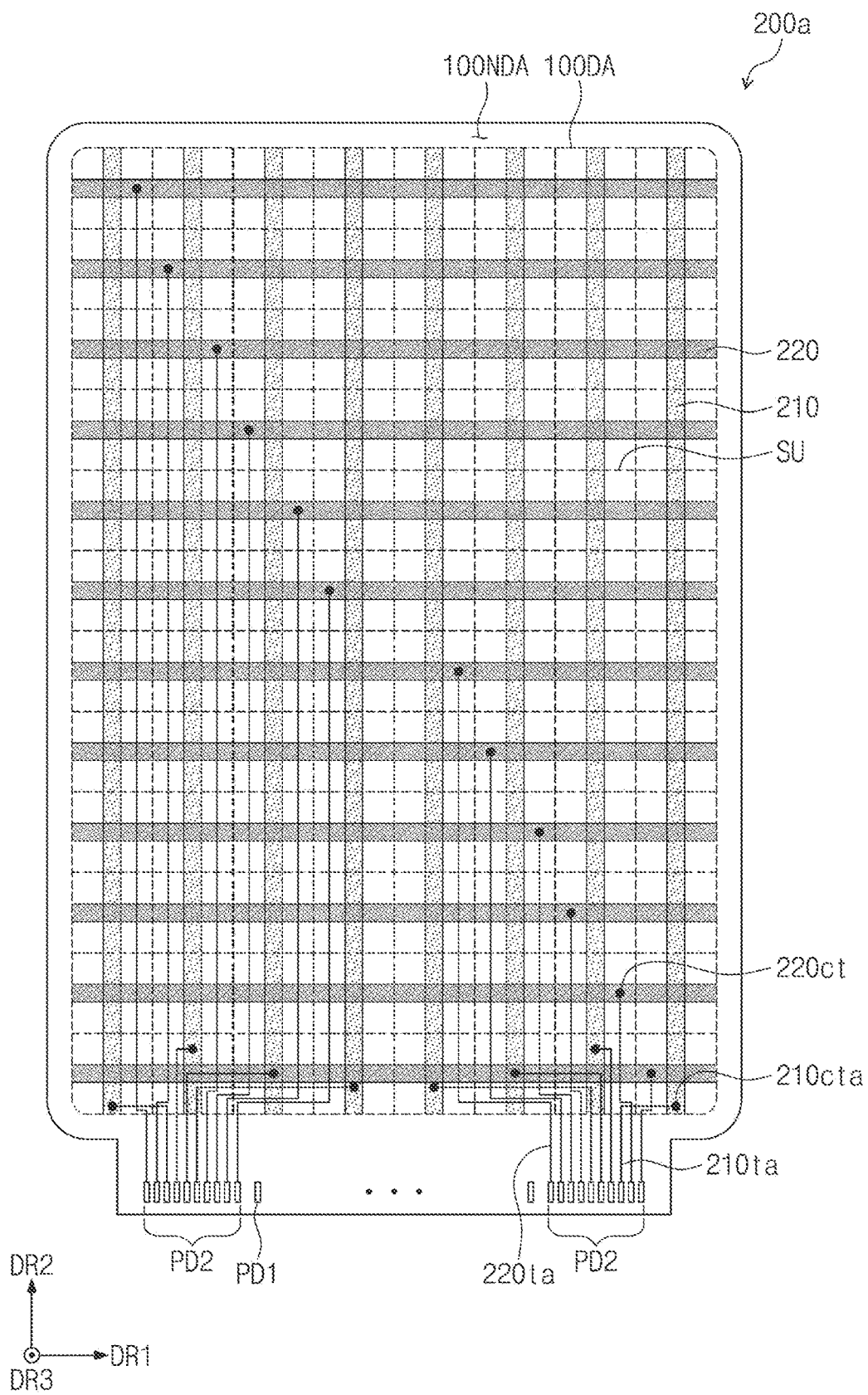
FIG. 5B is a plan view of a sensor layer according to an embodiment of the present disclosure.

FIG. 5B is a plan view of a sensor layer 200a according to an embodiment of the present disclosure.

Referring to FIG. 5B, the sensor layer 200a may include a plurality of first trace lines 210ta respectively electrically connected to the first electrodes 210 and a plurality of second trace lines 220ta respectively electrically connected to the second electrodes 220.

The first electrodes 210 and the first trace lines 210ta may be respectively connected to each other through (or at) a plurality of first contacts 210cta. The second electrodes 220 and the second trace lines 220ta may be respectively connected to each other through (or at) a plurality of second contacts 220ct.

In an embodiment of the present disclosure, both the first contacts 210cta and the second contacts 220ct may overlap the display region 100DA. Accordingly, portions of the first trace lines 210ta and the second trace lines 220ta may overlap the display region 100DA, and other portions thereof may overlap the peripheral region 100NDA.

According to an embodiment of the present disclosure, the portions of the first trace lines 210ta and the portions of the second trace lines 220ta overlapping the peripheral region 100NDA may all extend along the second direction DR2 to be electrically connected to the second pads PD2. The second pads PD2 may be arranged along the first direction DR1, and portions of each of the first and second trace lines 210ta and 220ta extending in the same direction as the arrangement direction of the second pads PD2 may all overlap the display region 100DA. Accordingly, the area of a portion of the peripheral region 100NDA between the display region 100DA and a region at where the second pads PD2 are disposed may be reduced.

According to an embodiment of the present disclosure, curved portions of the first trace lines 210ta and curved portions of the second trace lines 220ta may overlap the display region 100DA. Because the curved portions overlap the display region 100DA, the area of the peripheral region 100NDA between the display region 100DA and the region at where the second pads PD2 are disposed may be reduced. As a result, a region occupied by the peripheral region NDA (see, e.g., FIG. 1) on the display surface of the electronic device 1000 may be reduced, and a relatively narrow bezel may be implemented.

Figure 6:
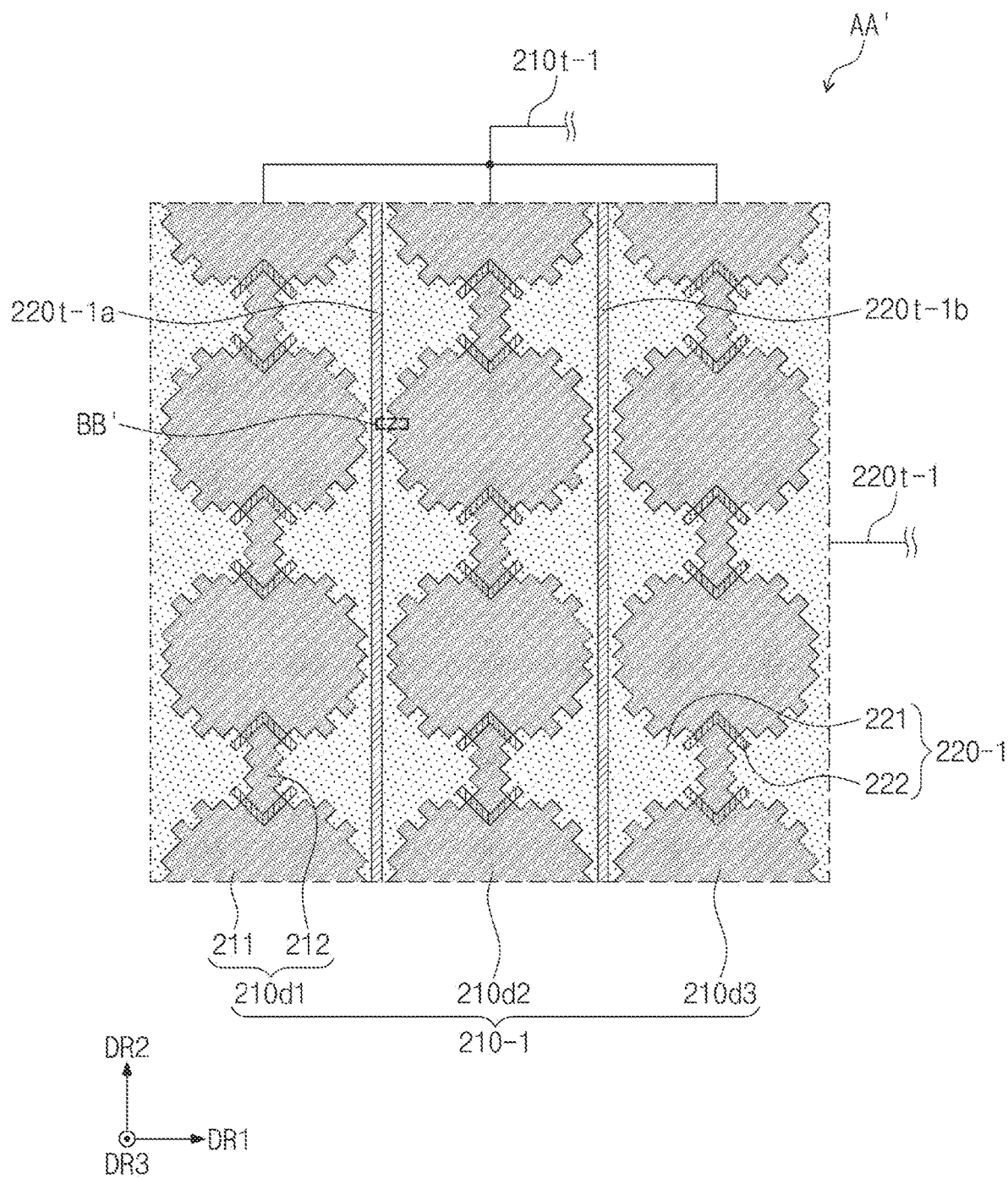
FIG. 6 is an enlarged plan view of the region AA' illustrated in FIG. 5A according to an embodiment of the present disclosure.

FIG. 6 is an enlarged plan view of the region AA illustrated in FIG. 5A according to an embodiment of the present disclosure.

Referring to FIGS. 5A and 6, FIG. 6 may correspond to a plan view of one sensing unit SU according to an embodiment of the present disclosure. The shape of the sensing unit SU illustrated in FIG. 6 is only an example, and the present disclosure is not limited thereto. Accordingly, the shape of the sensing unit SU may be variously modified.

The sensor layer 200 may be divided into a plurality of sensing units SU. Each of the sensing units SU may include a corresponding intersection region from among intersection regions of the first electrodes 210 and the second electrodes 220.

FIG. 6 representatively illustrates one sensing unit SU and also illustrates a portion of one first electrode 210-1 from among the first electrodes 210 and a portion of one second electrode 220-1 from among the second electrodes 220. One first electrode 210-1 may be referred to as an electrode, and one second electrode 220-1 may be referred to as a first cross electrode.

One first electrode 210-1 may be electrically connected to one first trace line 210t-1, and one second electrode 220-1 may be electrically connected to one second trace line 220t-1. Without being particularly limited thereto, however, one first electrode 210-1 may be electrically connected to a plurality of first trace lines that provide a same transmission signal or output a same reception signal. Similarly, one second electrode 220-1 may be electrically connected to a plurality of second trace lines that provide a same transmission signal or output a same reception signal.

One first electrode 210-1 may include a plurality of partition electrodes 210d1, 210d2, and 210d3. FIG. 6 illustrates an embodiment in which one first electrode 210-1 includes three partition electrodes 210d1, 210d2, and 210d3, but the number of the partition electrodes 210d1, 210d2, and 210d3 is not limited thereto. The partition electrodes 210d1, 210d2, and 210d3 may be arranged to be spaced apart from each other in the first direction DR1. Each of the partition electrodes 210d1, 210d2, and 210d3 may extend in the second direction DR2.

Second trace lines 220t-1a and 220t-1b may be respectively disposed between the partition electrodes 210d1, 210d2, and 210d3. For example, one second trace line 220t-1a may be disposed between two adjacent partition electrodes 210d1 and 210d2, and another second trace line 220t-1b may be disposed between two adjacent partition electrodes 210d2 and 210d3.

One second trace line 220t-1a and another second trace line 220t-1b may be respectively electrically connected to the second electrodes 220 included in sensing units SU other than the sensing unit SU illustrated in FIG. 6. For example, one second trace line 220t-1a may be electrically connected to another second electrode 220-2 spaced apart from one second electrode 220-1 in the second direction DR2, and another second trace line 220t-1b may be electrically connected to still another second electrode 220-3 spaced apart from one second electrode 220-1 in the second direction DR2. Another second electrode 220-2 may be referred to as a second cross electrode, and still another second electrode 220-3 may be referred to as a third cross electrode.

According to an embodiment of the present disclosure, when viewed on a plane, for example, when viewed in the third direction DR3, the second trace lines 220t-1a and 220t-1b may not overlap (e.g., may be offset from) the first electrodes 210. Accordingly, the influence of signal interference or parasitic capacitance between the first electrodes 210 and the second trace lines 220t-1a and 220t-1b may be minimized.

The second electrode 220-1 may include sensing patterns 221 and bridge patterns 222 disposed on a layer different from the sensing patterns 221. The sensing patterns 221 may be spaced apart from each other in the first direction DR1, and the bridge patterns 222 may electrically connect adjacent sensing patterns 221 to each other. FIG. 6 illustrates an embodiment in which two adjacent sensing patterns 221 are electrically connected to each other by six bridge patterns 222, but the present disclosure is not limited thereto.

Each of the partition electrodes 210d1, 210d2, and 210d3 may include a sensing portion 211 and a bridge portion 212. The sensing portion 211 and the bridge portion 212 may have an integral shape (e.g., may be integrally formed) and may be disposed on the same layer as each other. The sensing portion 211 may be referred to as a pattern portion or a first portion, and the bridge portion 212 may be referred to as a connection portion or a second portion. However, the sensing portion 211 may be referred to as a first sensing pattern, the bridge portion 212 may be referred to as a first bridge pattern, the sensing pattern 221 may be referred to as a second sensing pattern, and the bridge pattern 222 may be referred to as a second bridge pattern.

The sensing portion 211, the bridge portion 212, and the sensing pattern 221 may be disposed on the same layer as each other. The bridge patterns 222 and the second trace lines 220t-1a and 220t-1b may be disposed on the same layer as each other. For example, the sensing portion 211, the bridge portion 212, and the sensing pattern 221 may be included in the second sensor conductive layer 204, and the bridge patterns 222 and the second trace lines 220t-1a and 220t-1b may be included in the first sensor conductive layer 202. In such an embodiment, the sensor layer 200 has a structure in which the bridge patterns 222 are disposed closer to the display layer 100 than the sensing patterns 221. Accordingly, the sensor layer 200 may have a bottom bridge structure.

In another embodiment of the present disclosure, the sensor layer 200 may further include dummy patterns disposed between the partition electrodes 210d1, 210d2, and 210d3 and the sensing patterns 221. For example, the dummy patterns may be disposed on the same layer as the sensing portion 211, the bridge portion 212, and the sensing pattern 221, and each of the dummy patterns may be disposed between a portion of the first electrode 210-1 and a portion of the second electrode 220-1. Each of the dummy patterns may be electrically floated or grounded.

Figure 7:
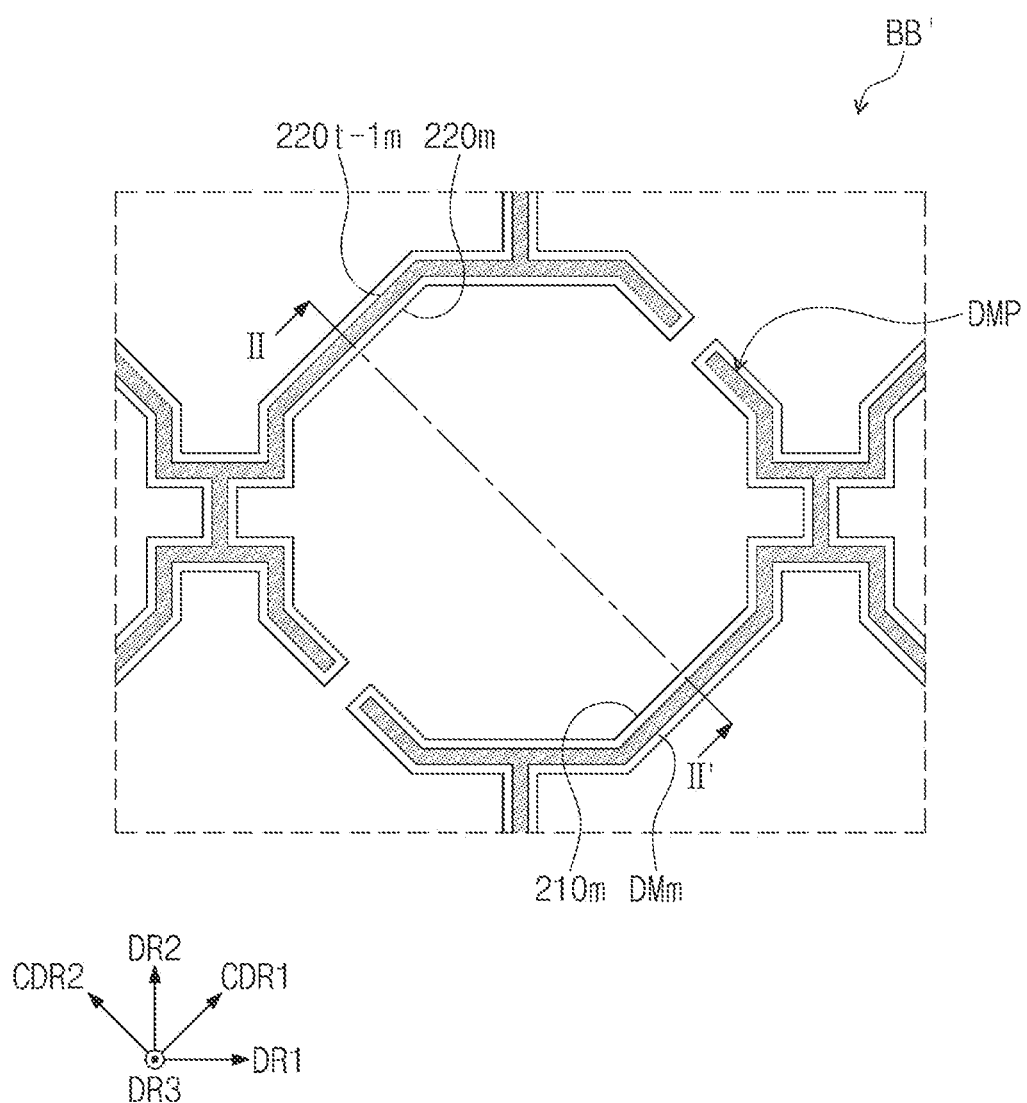
FIG. 7 is an enlarged plan view of the region BB' illustrated in FIG. 6 according to an embodiment of the present disclosure.

FIG. 7 is an enlarged plan view of the region BB' illustrated in FIG. 6 according to an embodiment of the present disclosure.

Referring to FIGS. 5A, 6, and 7, the sensor layer 200 may further include the dummy patterns DMp. The dummy patterns DMp may be disposed on the same layer as the second trace lines 220t-1a and 220t-1b and the bridge patterns 222.

Each of the first electrodes 210, the second electrodes 220, the second trace lines 220t-1a and 220t-1b, and the dummy patterns DMp may have a mesh structure. For example, the sensing portion 211 and the bridge portion 212 of each of the first electrodes 210 and the sensing pattern 221 and the bridge pattern 222 of each of the second electrodes 220 may have mesh structures. Each of the mesh structures may include a plurality of mesh lines. Each of the plurality of mesh lines may have a straight line shape extending in a direction (e.g., a predetermined direction) and may be connected to each other. An opening in which no mesh structure is disposed may be defined in each of the first electrodes 210, the second electrodes 220, the second trace lines 220t-1a and 220t-1b, and the dummy patterns DMp.

FIG. 7 illustrates an embodiment in which the mesh structure includes mesh lines extending along the first direction DR1, mesh lines extending along the second direction DR2, mesh lines extending along a first cross direction CDR1 crossing the first direction DR1 and the second direction DR2, and mesh lines extending along a second cross direction CDR2 crossing the first cross direction CDR1. However, the extension direction of the mesh lines constituting the mesh structure is not particularly limited to the embodiment shown in FIG. 7. For example, the mesh structure may include only the mesh lines extending in the first direction DR1 and the second direction DR2 or only the mesh lines extending in the first cross direction CDR1 and the second cross direction CDR2. That is, the mesh structure may be changed in various forms.

The first electrode 210 may include a first mesh line 210m, the second electrode 220 may include a second mesh line 220m, the second trace line 220t-1a may include a third mesh line 220t-1m, and the dummy pattern DMp may include a dummy mesh line DMm. The first mesh line 210m, the second mesh line 220m, the third mesh line 220t-1m, and the dummy mesh line DMm may respectively constitute mesh structures and may extend along one direction.

Hereinafter, the first mesh line 210m, the second mesh line 220m, the third mesh line 220t-1m, and the dummy mesh line DMm extending along the first cross direction CDR1 will be described. Each width of the first mesh line 210m, the second mesh line 220m, the third mesh line 220t-1m, and the dummy mesh line DMm may indicate a direction crossing the extension direction. That is, the width may be a width in a direction parallel to the second cross direction CDR2 crossing the first cross direction CDR1.

A mutual capacitance is formed between the first electrode 210-1 and the second electrode 220-1. An input coordinate of a touch may be derived according to a change in the mutual capacitance. For example, the capacitance formed between the first electrode 210-1 and the second electrode 220-1 may be an effective capacitance. However, a capacitance between the first electrode 210-1 and the second trace line 220t-1a is not used to calculate the input coordinate and may be a noise capacitance.

In an embodiment of the present disclosure, the width of the second mesh line 220m may be greater than that of the third mesh line 220t-1m. The width of the first mesh line 210m may be greater than that of the dummy mesh line DMm. In such an embodiment, at least a portion of a space between the second trace line 220t-1a and the first electrode 210 may be shielded by the second electrode 220. Accordingly, the noise capacitance between the first electrode 210-1 and the second trace line 220t-1a may be reduced, and thus, a ghost touch issue may be eliminated or reduced. That is, the electronic device 1000 (see, e.g., FIG. 1) may exhibit improved sensing performance.

Figure 8:
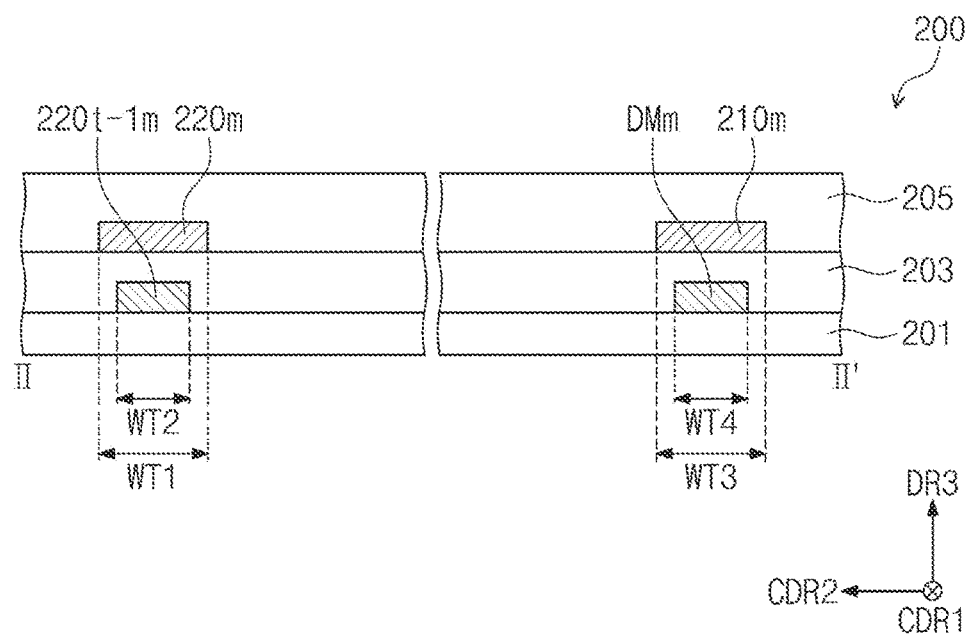
FIG. 8 is a cross-sectional view taken along the line II-II' illustrated in FIG. 7 according to an embodiment of the present disclosure.

FIG. 8 is a cross-sectional view taken along the line II-II' illustrated in FIG. 7 according to an embodiment of the present disclosure. For example, FIG. 8 is a cross-sectional view of the sensor layer 200 taken along the line II-II' illustrated in FIG. 7 according to an embodiment of the present disclosure.

Referring to FIGS. 6 and 8, the third mesh line 220t-1m and the dummy mesh line DMm may be disposed between the sensor base layer 201 and the sensor insulating layer 203, and the first mesh line 210m and the second mesh line 220m may be disposed between the sensor insulating layer 203 and the sensor cover layer 205. For example, the sensor insulating layer 203 may be disposed between the second trace line 220t-1a and the sensing pattern 221 of the second electrode 220-1. The sensor insulating layer 203 may be referred to as an insulating layer.

The sensor insulating layer 203 may include an organic material. Accordingly, the sensor insulating layer 203 may have a substantially flat upper surface. However, the present disclosure is not limited thereto, and the upper surface of the sensor insulating layer 203 may have protruding curves corresponding to the shapes of the third mesh line 220t-1m and the dummy mesh line DMm.

In an embodiment of the present disclosure, a first width WT1 of the second mesh line 220m may be greater than a second width WT2 of the third mesh line 220t-1m, and a third width WT3 of the first mesh line 210m may be greater than a fourth width WT4 of the dummy mesh line DMm. In such an embodiment, at least a portion of a space between the third mesh line 220t-1m of the second trace line 220t-1a and the first mesh line 210m of the first electrode 210-1 may be shielded by the second mesh line 220m of the second electrode 220-1. Accordingly, the noise capacitance between the first electrode 210-1 and the second trace line 220t-1a may be reduced, and thus, a ghost touch issue may be eliminated or reduced.

In an embodiment of the present disclosure, the first width WT1 of the second mesh line 220m may be substantially equal to the third width WT3 of the first mesh line 210m, and the second width WT2 of the third mesh line 220t-1m may be substantially equal to the fourth width WT4 of the dummy mesh line DMm. However, the present disclosure is not particularly limited thereto.

Figure 9:
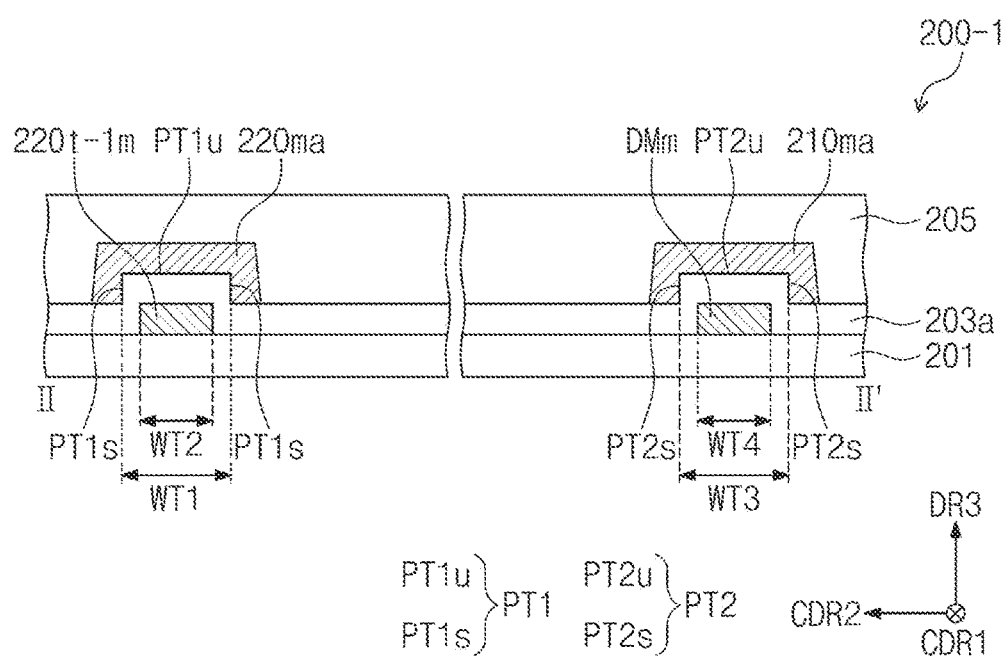
FIG. 9 is a cross-sectional view taken along line II-II' illustrated in FIG. 7 according to another embodiment of the present disclosure.

FIG. 9 is a cross-sectional view taken along the line II-II' illustrated in FIG. 7 according to another embodiment of the present disclosure. For example, FIG. 9 is a cross-sectional view of a sensor layer 200-1 taken along the line II-II' illustrated in FIG. 7 according to another embodiment of the present disclosure, which is.

Referring to FIGS. 6 and 9, the third mesh line 220t-1m and the dummy mesh line DMm may be disposed between the sensor base layer 201 and the sensor insulating layer 203, and a first mesh line 210ma and a second mesh line 220ma may be disposed between the sensor insulating layer 203 and the sensor cover layer 205.

In an embodiment of the present disclosure, the sensor insulating layer 203 may include an inorganic material. The upper surface of the sensor insulating layer 203 may have a first protruding portion PT1 protruding corresponding to the shape of the third mesh line 220t-1m and a second protruding portion PT2 protruding corresponding to the shape of the dummy mesh line DMm.

The second mesh line 220ma may be disposed on and may cover the first protruding portion PT1. The first width WT1 of the second mesh line 220ma may be greater than the second width WT2 of the third mesh line 220t-1m. The second mesh line 220ma may cover an upper surface PT1u of the first protruding portion PT1 and side surfaces PT1s of the first protruding portion PT1.

The first mesh line 210ma is disposed on and may cover the second protruding portion PT2. The third width WT3 of the first mesh line 210ma may be greater than the fourth width WT4 of the dummy mesh line DMm. The first mesh line 210ma may cover an upper surface PT2u of the second protruding portion PT2 and side surfaces PT2s of the second protruding portion PT2.

In such an embodiment, at least a portion of a space between the third mesh line 220t-1m of the second trace line 220t-1a and the first mesh line 210ma of the first electrode 210-1 may be shielded by the second mesh line 220ma of the second electrode 220-1. Accordingly, the noise capacitance between the first electrode 210-1 and the second trace line 220t-1a may be reduced, and thus, a ghost touch issue may be eliminated or reduced.

Figure 10A:
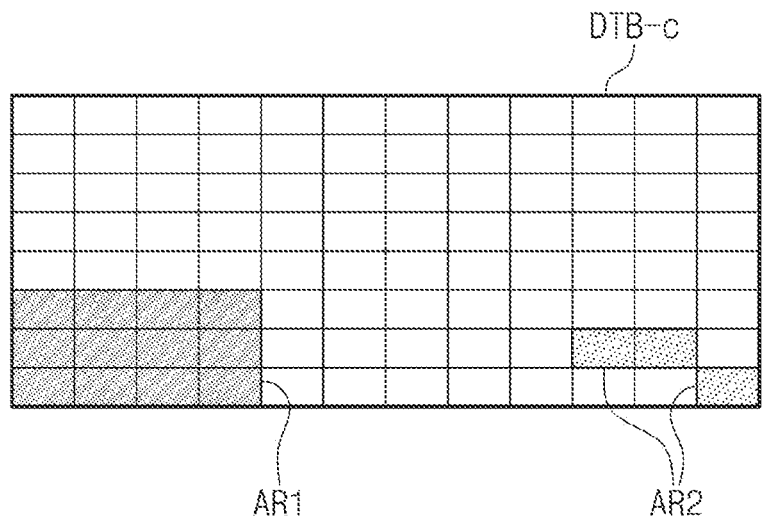
FIG. 10A illustrates sensing data blocks according to a comparative embodiment of the present disclosure.
Figure 10B:
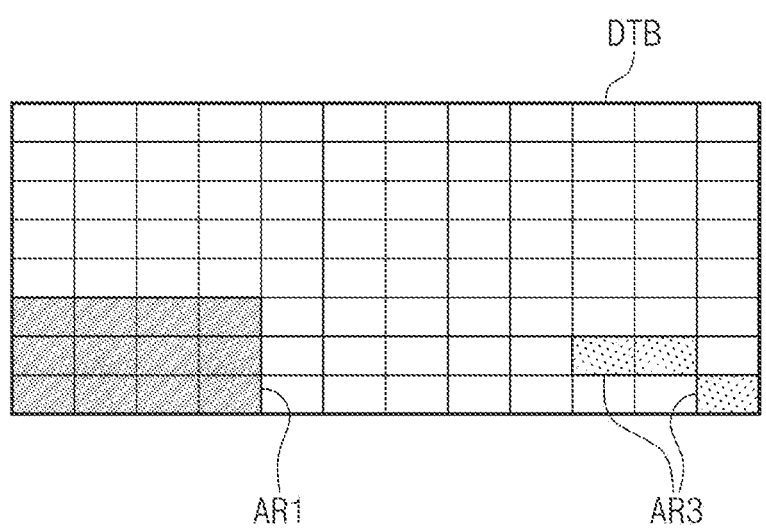
FIG. 10B illustrates sensing data blocks according to an embodiment of the present disclosure.

FIG. 10A illustrates sensing data blocks DTB-c according to a comparative embodiment of the present disclosure, and FIG. 10B illustrates sensing data blocks DTB according to an embodiment of the present disclosure.

Referring to FIGS. 10A and 10B, ninety-six sensing data blocks DTB-c or DTB corresponding to either first electrodes 210 and twelve second electrodes 220, as illustrated in FIG. 5A, are illustrated as an example.

From among the sensing data blocks DTB-c or DTB, the blocks of a first region AR1 indicated by the darkest hatching have a sensitivity value exceeding a reference value. That is, the first region AR1 corresponds to a region in which a valid touch has occurred. From among the sensing data blocks DTB-c illustrated in FIG. 10A, a second region AR2 corresponds to a region in which a ghost touch has occurred. From among the sensing data blocks DTB illustrated in FIG. 10B, a third region AR3 corresponds to the second region AR2.

Referring to FIG. 10A, when the width of the third mesh line of the second trace line is equal to the width of the second mesh line of the second electrode, a sensitivity value at a level of about 58% or about 60% of effective sensitivity values may be sensed in the second region AR2. For example, in the sensing data blocks DTB-c, the minimum value of the sensitivity values of the first region AR1 may be about 1.03E-13 (i.e., $1.03*10^{-13}$), and the maximum value of the sensitivity values of the second region AR2 may be about 6.21E-14 (i.e., $6.21*10^{-14}$). In this case, a touch may be mistakenly judged (or determined) to have occurred not only in the first region AR1 at where a valid input has occurred but also in the second region AR2. Accordingly, a ghost touch phenomenon may occur (e.g., may occur at the second region AR2).

Referring to FIG. 10B, when the width of the third mesh line 220t-1m (see, e.g., FIG. 7) of the second trace line 220t-1a (see, e.g., FIG. 6) is smaller than the width of the second mesh line 220m (see, e.g., FIG. 7) of the second electrode 220-1 (see, e.g., FIG. 6), a sensitivity value sensed in the third region AR3 may be about 18% of an effective sensitivity value sensed in the first region AR1. For example, in the sensing data blocks DTB, the minimum value of the sensitivity values of the first region AR1 may be about 1.28E-13 (i.e., $1.28*10^{-13}$), and the maximum value of the sensitivity values of the third region AR3 may be about 2.41E-14 (i.e., $2.41*10^{-14}$). That is, the noise capacitance between the first electrode 210-1 and the second trace line 220t-1a may be reduced by the second mesh line 220ma of the second electrode 220-1, and accordingly, a ghost touch issue may be eliminated or reduced.

Figure 11:
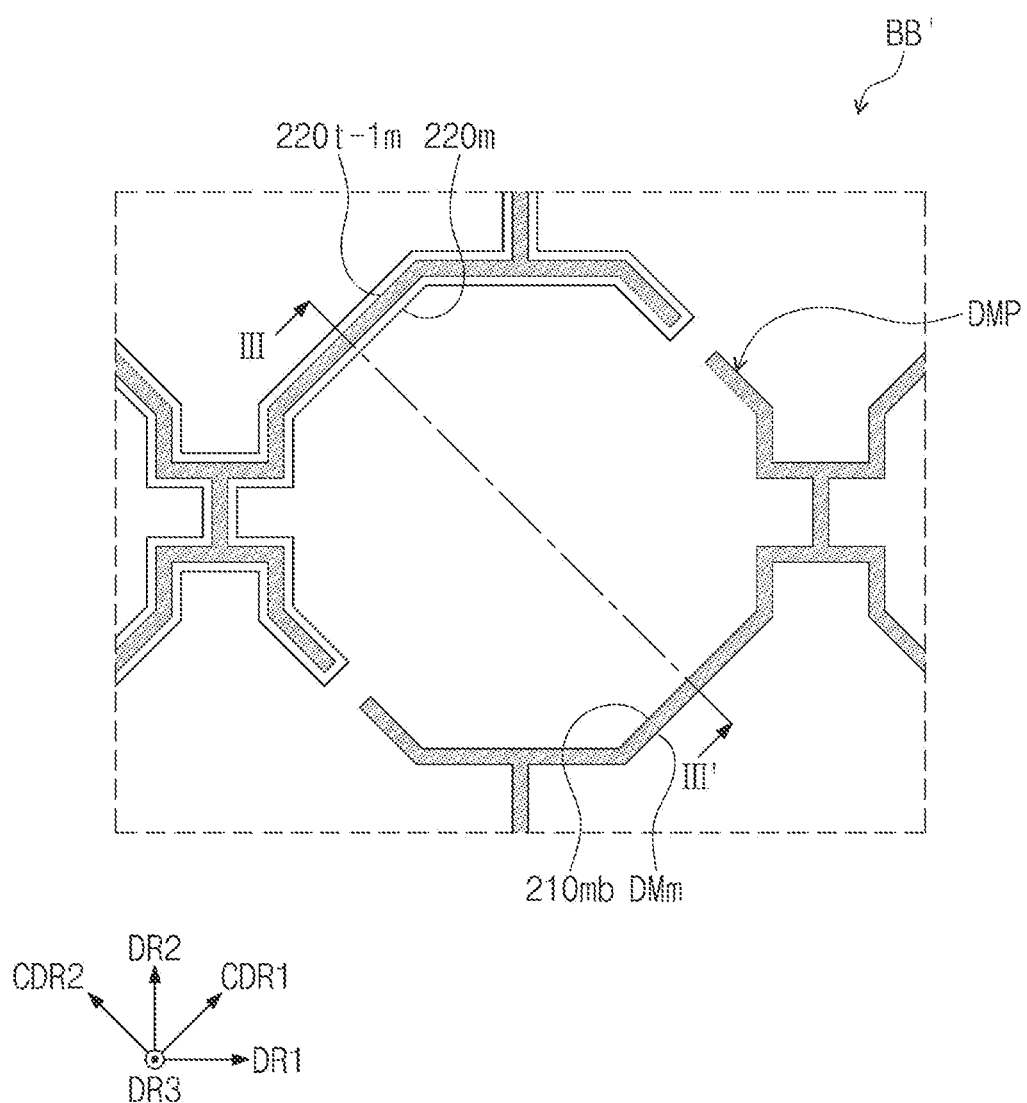
FIG. 11 is an enlarged plan view of the region BB' illustrated in FIG. 6 according to another embodiment of the present disclosure.

FIG. 11 is an enlarged plan view of the region BB' illustrated in FIG. 6 according to another embodiment of the present disclosure.

Referring to FIGS. 5A, 6, and 11, the first electrode 210-1 may include a first mesh line 210mb, the second electrode 220-1 may include a second mesh line 220m, the second trace line 220t-1a may include a third mesh line 220t-1m, and the dummy pattern DMp may include a dummy mesh line DMm.

In an embodiment of the present disclosure, the width of the second mesh line 220m may be greater than that of the third mesh line 220t-1m, and the width of the first mesh line 210mb may be substantially the same as that of the dummy mesh line DMm.

In such an embodiment, at least a portion of the space between the second trace line 220t-1a and the first electrode 210-1 may be shielded by the mesh line of the second electrode 220-1 protruding more than (e.g., protruding beyond) the mesh line (e.g., the third mesh line 220t-1m) of the second trace line 220t-1a. Accordingly, noise capacitance may be reduced, and thus, a ghost touch issue may be eliminated or reduced. That is, the electronic device 1000 (see, e.g., FIG. 1) may exhibit improved sensing performance.

Figure 12:
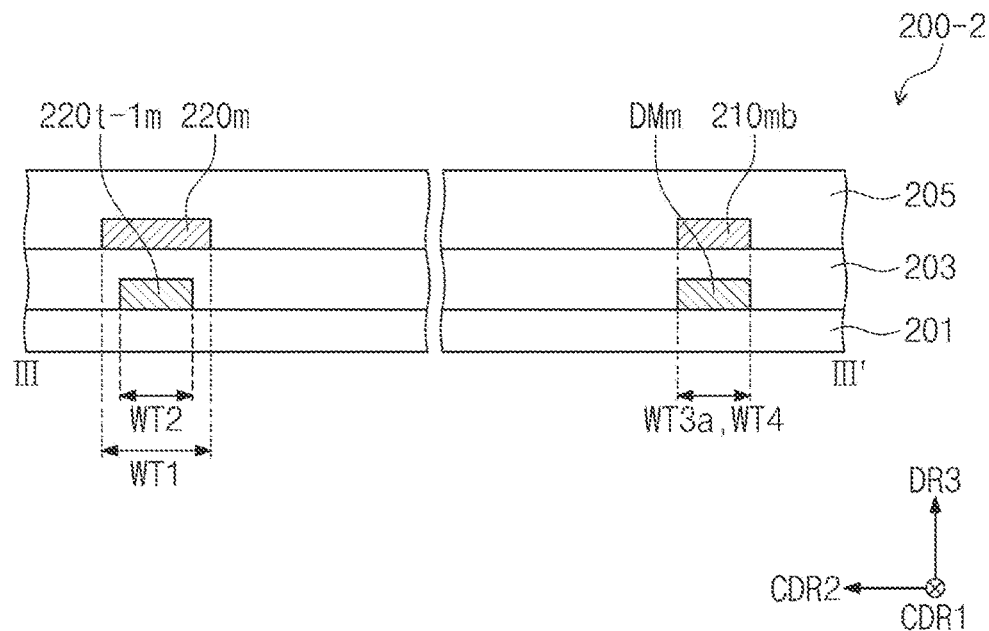
FIG. 12 is a cross-sectional view taken along the line III-III' illustrated in FIG. 11 according to an embodiment of the present disclosure.

FIG. 12 is a cross-sectional view taken along the line III-III' illustrated in FIG. 11 according to an embodiment of the present disclosure. For example, FIG. 12 is a cross-sectional view of a sensor layer 200-2 taken along the line III-III' shown in FIG. 11 according to an embodiment of the present disclosure.

Referring to FIGS. 11 and 12, the first width WT1 of the second mesh line 220m may be greater than the second width WT2 of the third mesh line 220t-1m, and the third width WT3a of the first mesh line 210mb may be substantially equal to the fourth width WT4 of the dummy mesh line DMm. In such an embodiment, at least a portion of the space between the third mesh line 220t-1m of the second trace line 220t-1a and the first mesh line 210mb of the first electrode 210 may be shielded by the second mesh line 220m of the second electrode 220-1. Accordingly, the noise capacitance between the first electrode 210-1 and the second trace line 220t-1a may be reduced, and thus, a ghost touch issue may be eliminated or reduced.

Figure 13:
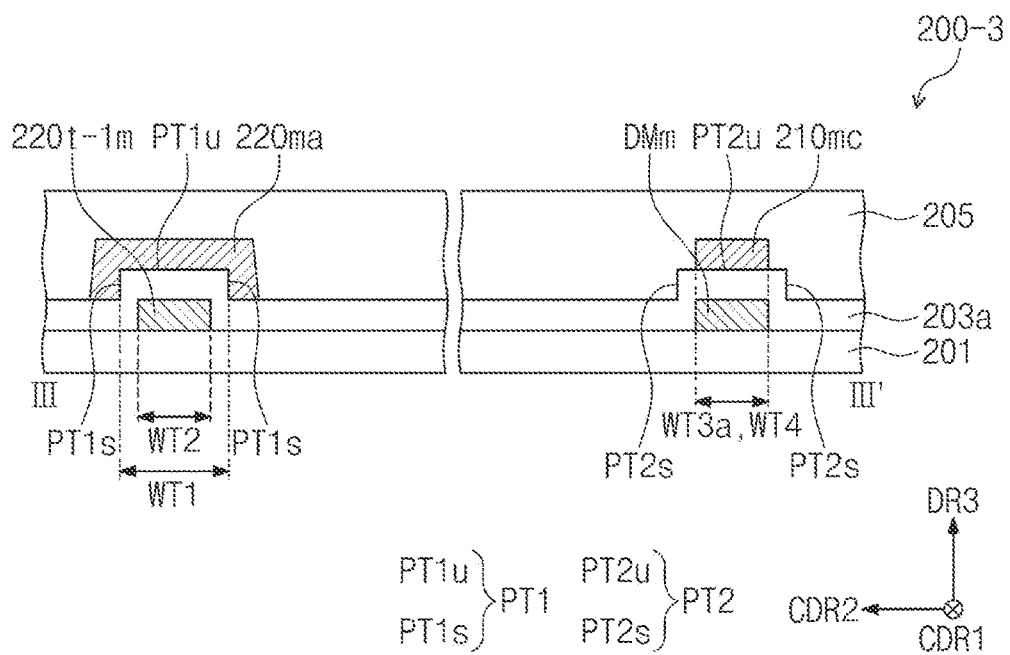
FIG. 13 is a cross-sectional view taken along the line III-III' illustrated in FIG. 11 according to another embodiment of the present disclosure.

FIG. 13 is a cross-sectional view taken along the line III-III' illustrated in FIG. 11 according to another embodiment of the present disclosure. For example, FIG. 13 is a cross-sectional view of a sensor layer 200-3 taken along the line III-III' illustrated in FIG. 11 according to another embodiment of the present disclosure.

Referring to FIGS. 11 and 13, the second mesh line 220ma may be disposed on and may cover the first protruding portion PT1. The first width WT1 of the second mesh line 220ma may be greater than the second width WT2 of the third mesh line 220t-1m. The second mesh line 220ma may cover the upper surface PT1u of the first protruding portion PT1 and the side surfaces PT1s of the first protruding portion PT1.

The first mesh line 210mc may be disposed on the second protruding portion PT2. The third width WT3a of the first mesh line 210mc may be equal to the fourth width WT4 of the dummy mesh line DMm. The first mesh line 210mc may be disposed on the upper surface PT2u of the second protruding portion PT2 and spaced apart from the side surfaces PT2s of the second protruding portion PT2.

At least a portion of the space between the third mesh line 220t-1m of the second trace line 220t-1a and the first mesh line 210mc of the first electrode 210-1 may be shielded by the second mesh line 220ma of the second electrode 220-1. Accordingly, the noise capacitance between the first electrode 210-1 and the second trace line 220t-1a may be reduced, and thus, a ghost touch issue may be eliminated or reduced.

Figure 14:
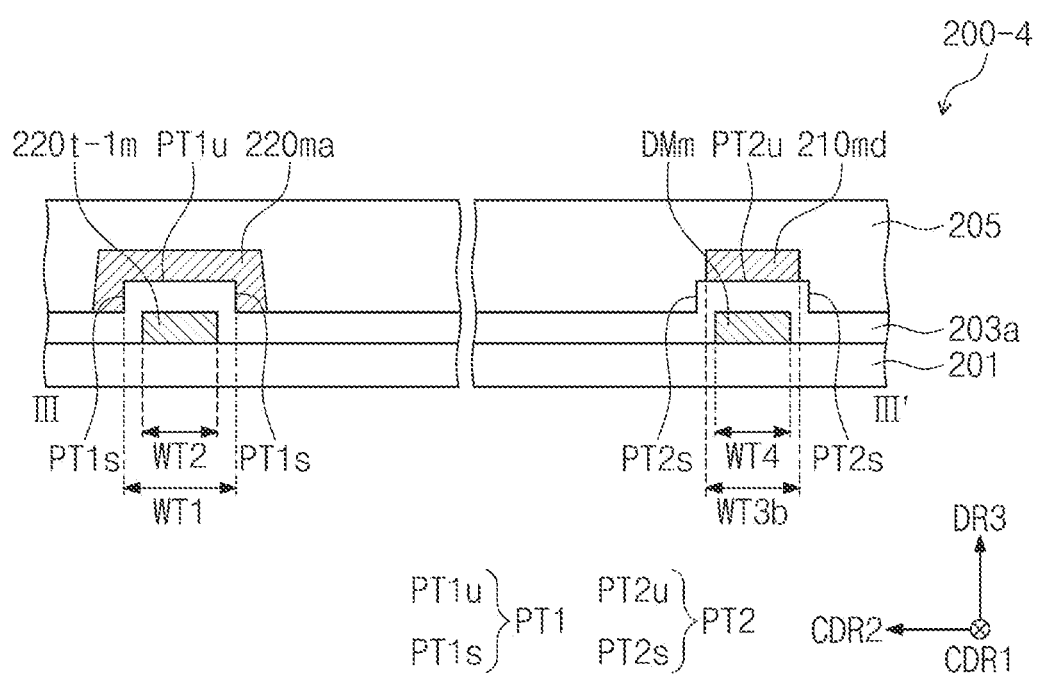
FIG. 14 is a cross-sectional view taken along the line III-III' illustrated in FIG. 11 according to another embodiment of the present disclosure.

FIG. 14 is a cross-sectional view taken along the line III-III' illustrated in FIG. 11 according to another embodiment of the present disclosure. For example, FIG. 14 is a cross-sectional view of a sensor layer 200-4 taken along the line III-III' shown in FIG. 11 according to another embodiment of the present disclosure.

Referring to FIGS. 11 and 14, the first width WT1 of the second mesh line 220ma may be greater than the second width WT2 of the third mesh line 220t-1m, and the third width WT3b of the first mesh line 210md may be greater than the fourth width WT4 of the dummy mesh line DMm. The first mesh line 210md may be disposed on the upper surface PT2u of the second protruding portion PT2 and spaced apart from the side surfaces PT2s of the second protruding portion PT2.

At least a portion of the space between the third mesh line 220t-1m of the second trace line 220t-1a and the first mesh line 210md of the first electrode 210-1 may be shielded by the second mesh line 220ma of the second electrode 220-1. Accordingly, the noise capacitance between the first electrode 210-1 and the second trace line 220t-1a may be reduced, and thus, a ghost touch issue may be eliminated or reduced.

As described above, a mutual capacitance is formed between the first electrode and the second electrode. An input coordinate of a touch may be derived according to a change in the mutual capacitance. At least a portion of a space between the mesh line of the first electrode and the mesh line of the trace line electrically connected to the other second electrode may be shielded by the mesh line of the second electrode. Accordingly, a noise capacitance between the first electrode and the second trace line may be reduced, and thus, a ghost touch issue may be eliminated or reduced. Thus, the electronic device may exhibit improved sensing performance.

In addition, the second trace lines electrically connected to the second electrodes may not overlap the first electrodes. Accordingly, the influence of signal interference or parasitic capacitance between the first electrodes and the second trace lines may be minimized.

Although the present disclosure has been described with reference to embodiments of the present disclosure, those skilled in the art or those having ordinary knowledge in the art would understand that these embodiments may be modified in ways that do not deviate from the spirit and technical scope of the present invention described in the claims, to be described later, and their equivalents. It will be understood that the present disclosure can be variously modified and changed within the scope thereof. Therefore, the technical scope of the present disclosure is not limited to the contents described in the detailed description of the specification but should be determined by the claims and their equivalents.

What is claimed is:

1. An electronic device comprising:
   a sensor base layer;
   an electrode comprising a first mesh line on an upper surface of the sensor base layer;
   a first cross electrode crossing the electrode and comprising a second mesh line on the upper surface of the sensor base layer;
   a second cross electrode crossing the electrode and spaced apart from the first cross electrode on the upper surface of the sensor base layer; and
   a trace line overlapping the first cross electrode, electrically connected to the second cross electrode, and comprising a third mesh line on the upper surface of the sensor base layer,
   wherein the second mesh line and the third mesh line extend along a same extension direction parallel to the upper surface of the sensor base layer,
   wherein, in a cross-sectional view perpendicular to the upper surface of the sensor base layer and perpendicular to the extension direction of the second mesh line and the third mesh line, a width of the second mesh line is greater than a width of the third mesh line, and
   wherein the width of the second mesh line and the width of the third mesh line are parallel to each other in a direction perpendicular to the extension direction.

2. The electronic device of claim 1, further comprising an insulating layer between the trace line and the first cross electrode.

3. The electronic device of claim 2, wherein the insulating layer comprises an organic material.

4. The electronic device of claim 2, wherein an upper surface of the insulating layer has a first protruding portion corresponding to a shape of the third mesh line.

5. The electronic device of claim 4, wherein the second mesh line covers an upper surface of the first protruding portion of the insulating layer and side surfaces of the first protruding portion.

6. The electronic device of claim 4, further comprising a dummy mesh line below the insulating layer and on a same layer as the trace line,
   wherein the insulating layer further comprises a second protruding portion corresponding to a shape of the dummy mesh line, and
   wherein the first mesh line is on the second protruding portion.

7. The electronic device of claim 6, wherein the first mesh line is on an upper surface of the second protruding portion and is spaced apart from side surfaces of the second protruding portion.

8. The electronic device of claim 6, wherein the first mesh line covers an upper surface of the second protruding portion and side surfaces of the second protruding portion.

9. An electronic device comprising:
   an electrode comprising a first mesh line;
   a first cross electrode crossing the electrode and comprising a second mesh line;
   a second cross electrode crossing the electrode and spaced apart from the first cross electrode;
   a trace line overlapping the first cross electrode, electrically connected to the second cross electrode, and comprising a third mesh line;
   an insulating layer between the trace line and the first cross electrode; and
   a dummy mesh line below the insulating layer and on a same layer as the trace line,
   wherein a width of the second mesh line is greater than a width of the third mesh line, and
   wherein a width of the first mesh line is greater than or equal to a width of the dummy mesh line.

10. The electronic device of claim 1, wherein the trace line does not overlap the electrode.

11. An electronic device comprising:
    a display layer having a display region configured to display an image and a peripheral region adjacent to the display region; and
    a sensor layer on the display layer, the sensor layer comprising:
      a sensor base layer;
      a plurality of first electrodes arranged in a first direction on an upper surface of the sensor base layer;
      a plurality of second electrodes arranged in a second direction crossing the first direction and crossing the plurality of first electrodes on the upper surface of the sensor base layer;
      a plurality of first trace lines electrically connected to the plurality of first electrodes, respectively, on the upper surface of the sensor base layer; and
      a plurality of second trace lines electrically connected to the plurality of second electrodes, respectively, and at least partially overlapping the display region on the upper surface of the sensor base layer,
    wherein, in a cross-sectional view perpendicular to the upper surface of the sensor base layer and perpendicular to an extension direction of a first mesh line from among the plurality of second trace lines and a second mesh line from among the plurality of second electrodes, a width of the first mesh line is smaller than a width of the second mesh line, and
    wherein the first mesh line and the second mesh line extend along a same extension direction parallel to the upper surface of the sensor base layer, and
    wherein the width of the first mesh line and the width of the second mesh line are parallel to each other in a direction perpendicular to the extension direction.

12. The electronic device of claim 11, wherein the plurality of second trace lines do not overlap the plurality of first electrodes.

13. The electronic device of claim 11, wherein the plurality of first electrodes or the plurality of second electrodes comprise:
    a plurality of sensing patterns; and
    a plurality of bridge patterns on a layer different from that of the plurality of sensing patterns and electrically connected to the plurality of sensing patterns,
    wherein the plurality of second trace lines are on a same layer as the plurality of bridge patterns, and wherein the sensor layer further comprises an insulating layer between the plurality of sensing patterns and the plurality of bridge patterns.

14. The electronic device of claim 13, wherein the insulating layer comprises an inorganic material.

15. The electronic device of claim 13, wherein an upper surface of the insulating layer has a first protruding portion corresponding to a shape of the first mesh line from among the plurality of second trace lines.

16. The electronic device of claim 15, wherein the second mesh line from among the plurality of second electrodes covers an upper surface of the first protruding portion and side surfaces of the first protruding portion.

17. The electronic device of claim 15, further comprising a dummy mesh line below the insulating layer and on the same layer as the plurality of second trace lines,
wherein the insulating layer further comprises a second protruding portion corresponding to a shape of the dummy mesh line, and
wherein a third mesh line from among the plurality of first electrodes is on the second protruding portion.

18. The electronic device of claim 17, wherein the third mesh line from among the plurality of first electrodes is on an upper surface of the second protruding portion and is spaced apart from side surfaces of the second protruding portion.

19. The electronic device of claim 17, wherein the third mesh line from among the plurality of first electrodes covers an upper surface of the second protruding portion and side surfaces of the second protruding portion.

20. The electronic device of claim 11, wherein the width of the second mesh line from among the plurality of second electrodes is greater than or equal to a width of a third mesh line from among the plurality of first electrodes.

* * * * *